United States Patent
Alam et al.

(10) Patent No.: US 8,167,999 B2
(45) Date of Patent: May 1, 2012

(54) THREE-DIMENSIONAL PRINTING MATERIAL SYSTEM WITH IMPROVED COLOR, ARTICLE PERFORMANCE, AND EASE OF USE

(75) Inventors: Amir Alam, Milwaukee, WI (US); James F. Bredt, Watertown, MA (US); Nanette Clark, North Andover, MA (US); Mary Flynn, Littleton, MA (US); Jean Sprauer, Jamaica Plain, MA (US); Derek X. Williams, Berwick, ME (US)

(73) Assignee: 3D Systems, Inc., Rock Hill, SC (US)

( * ) Notice: Subject to any disclaimer, the term of this patent is extended or adjusted under 35 U.S.C. 154(b) by 673 days.

(21) Appl. No.: 11/972,485

(22) Filed: Jan. 10, 2008

(65) Prior Publication Data
US 2008/0187711 A1    Aug. 7, 2008

Related U.S. Application Data

(60) Provisional application No. 60/879,703, filed on Jan. 10, 2007.

(51) Int. Cl.
*C04B 9/04* (2006.01)
*C04B 11/00* (2006.01)
*C04B 28/14* (2006.01)

(52) U.S. Cl. ...................... 106/772; 106/778

(58) Field of Classification Search ............ 106/400, 106/772, 773, 779, 782, 778; 524/2, 8; 264/123, 264/109, 122; 428/114
See application file for complete search history.

(56) References Cited

U.S. PATENT DOCUMENTS

| | | | |
|---|---|---|---|
| 2,156,242 A * | 4/1939 | Kharasch et al. | 546/69 |
| 2,296,636 A * | 9/1942 | Hanahan | 106/420 |
| 2,522,548 A | 9/1950 | Streicher | |
| 2,662,024 A | 12/1953 | Riddell et al. | |
| 3,297,601 A | 1/1967 | Maynard et al. | |
| 3,303,147 A | 2/1967 | Elden | |
| 3,309,328 A | 3/1967 | Carroll et al. | |
| 3,476,190 A | 11/1969 | Jenny et al. | |
| 3,525,632 A | 8/1970 | Enoch | |
| 3,642,683 A | 2/1972 | Fry at al. | |
| 3,821,006 A | 6/1974 | Schwartz | |
| 3,835,074 A | 9/1974 | Desmarais | |
| 3,852,083 A | 12/1974 | Yang | |
| 3,870,538 A | 3/1975 | Burkard et al. | |
| 3,890,305 A | 6/1975 | Weber et al. | |

(Continued)

FOREIGN PATENT DOCUMENTS
CN     1810492     2/2006
(Continued)

OTHER PUBLICATIONS

International Preliminary Report on Patentability for Intl. Application No. PCT/US2008/002362, mailed Sep. 3, 2009 (10 pages).

(Continued)

*Primary Examiner* — Anthony J Green
*Assistant Examiner* — Pegah Parvini

(57) ABSTRACT

A materials system and methods are provided to enable the formation of articles by three dimensional printing. The materials system includes particulate mixtures having a whitening agent and a solid particulate additive comprising an acid, the latter adapted for modifying a cure rate of an infiltrant. The materials system also includes aqueous fluids including optical brightening agents.

17 Claims, 21 Drawing Sheets

U.S. PATENT DOCUMENTS

| | | |
|---|---|---|
| 3,926,870 A | 12/1975 | Keegan et al. |
| 3,930,872 A | 1/1976 | Toeniskoetter et al. |
| 3,932,923 A | 1/1976 | DiMatteo |
| 4,041,476 A | 8/1977 | Swainson |
| 4,042,408 A | 8/1977 | Murray et al. |
| 4,078,229 A | 3/1978 | Swanson et al. |
| 4,247,508 A | 1/1981 | Housholder |
| 4,288,861 A | 9/1981 | Swainson et al. |
| 4,303,556 A * | 12/1981 | Llendado ............ 510/452 |
| 4,310,996 A | 1/1982 | Mulvey et al. |
| 4,327,156 A | 4/1982 | Dillon et al. |
| 4,369,025 A | 1/1983 | von der Weid et al. |
| 4,443,392 A | 4/1984 | Becker et al. |
| 4,444,594 A | 4/1984 | Paddison et al. |
| 4,476,190 A | 10/1984 | Clarke et al. |
| 4,575,330 A | 3/1986 | Hull |
| 4,613,627 A | 9/1986 | Sherman et al. |
| 4,618,390 A | 10/1986 | Powell |
| 4,649,077 A | 3/1987 | Lauchenauer et al. |
| 4,665,492 A | 5/1987 | Masters |
| 4,752,352 A | 6/1988 | Feygin |
| 4,752,498 A | 6/1988 | Fudim |
| 4,755,227 A | 7/1988 | Sherif et al. |
| 4,758,278 A | 7/1988 | Tomic |
| 4,801,477 A | 1/1989 | Fudim |
| 4,844,144 A | 7/1989 | Murphy et al. |
| 4,863,538 A | 9/1989 | Deckard |
| 4,929,402 A | 5/1990 | Hull |
| 4,938,816 A | 7/1990 | Beaman et al. |
| 4,940,412 A | 7/1990 | Blumenthal et al. |
| 4,942,001 A | 7/1990 | Murphy et al. |
| 4,942,003 A | 7/1990 | Bold et al. |
| 4,942,060 A | 7/1990 | Grossa et al. |
| 4,943,928 A | 7/1990 | Campbell et al. |
| 4,944,817 A | 7/1990 | Bourell et al. |
| 4,945,032 A | 7/1990 | Murphy et al. |
| 4,961,154 A | 10/1990 | Pomerantz et al. |
| 4,996,010 A | 2/1991 | Modrek |
| 4,996,282 A | 2/1991 | Noren et al. |
| 4,999,143 A | 3/1991 | Hull et al. |
| 5,009,585 A | 4/1991 | Hirano et al. |
| 5,011,635 A | 4/1991 | Murphy et al. |
| 5,015,312 A | 5/1991 | Kinzie |
| 5,015,424 A | 5/1991 | Smalley |
| 5,017,317 A | 5/1991 | Marcus |
| 5,017,395 A * | 5/1991 | McCaskill et al. ............ 426/459 |
| 5,017,753 A | 5/1991 | Deckard |
| 5,031,120 A | 7/1991 | Pomerantz et al. |
| 5,038,014 A | 8/1991 | Pratt et al. |
| 5,040,005 A | 8/1991 | Davidson et al. |
| 5,051,334 A | 9/1991 | Fan |
| 5,053,090 A | 10/1991 | Beaman et al. |
| 5,058,988 A | 10/1991 | Spence |
| 5,059,021 A | 10/1991 | Spence et al. |
| 5,059,266 A | 10/1991 | Yamane et al. |
| 5,059,359 A | 10/1991 | Hull et al. |
| 5,071,337 A | 12/1991 | Heller et al. |
| 5,071,503 A | 12/1991 | Berman et al. |
| 5,076,869 A | 12/1991 | Bourell et al. |
| 5,076,974 A | 12/1991 | Modrek et al. |
| 5,088,047 A | 2/1992 | Bynum |
| 5,089,184 A | 2/1992 | Hirano et al. |
| 5,089,185 A | 2/1992 | Hirano et al. |
| 5,094,935 A | 3/1992 | Vassiliou et al. |
| 5,096,491 A | 3/1992 | Nagai et al. |
| 5,096,530 A | 3/1992 | Cohen |
| 5,104,592 A | 4/1992 | Hull et al. |
| 5,106,288 A | 4/1992 | Hughes et al. |
| 5,121,329 A | 6/1992 | Crump |
| 5,122,441 A | 6/1992 | Lawton et al. |
| 5,123,734 A | 6/1992 | Spence et al. |
| 5,127,037 A | 6/1992 | Bynum |
| 5,128,235 A | 7/1992 | Vassiliou et al. |
| 5,130,064 A | 7/1992 | Smalley et al. |
| 5,132,143 A | 7/1992 | Deckard |
| 5,133,987 A | 7/1992 | Spence et al. |
| 5,134,569 A | 7/1992 | Masters |
| 5,135,379 A | 8/1992 | Fudim |
| 5,135,695 A | 8/1992 | Marcus |
| 5,137,662 A | 8/1992 | Hull et al. |
| 5,139,338 A | 8/1992 | Pomerantz et al. |
| 5,139,711 A | 8/1992 | Nakamura et al. |
| 5,141,680 A | 8/1992 | Almquist et al. |
| 5,143,663 A | 9/1992 | Leyden et al. |
| 5,143,817 A | 9/1992 | Lawton et al. |
| 5,147,587 A | 9/1992 | Marcus et al. |
| 5,149,548 A | 9/1992 | Yamane et al. |
| 5,151,813 A | 9/1992 | Yamamoto et al. |
| 5,154,762 A | 10/1992 | Mitra et al. |
| 5,155,321 A | 10/1992 | Grube et al. |
| 5,155,324 A | 10/1992 | Deckard et al. |
| 5,157,423 A | 10/1992 | Zur et al. |
| 5,158,858 A | 10/1992 | Lawton et al. |
| 5,164,882 A | 11/1992 | Kanai et al. |
| 5,167,882 A | 12/1992 | Jacobine et al. |
| 5,169,579 A | 12/1992 | Marcus et al. |
| 5,171,490 A | 12/1992 | Fudim |
| 5,173,220 A | 12/1992 | Reiff et al. |
| 5,174,931 A | 12/1992 | Almquist et al. |
| 5,174,943 A | 12/1992 | Hull |
| 5,175,077 A | 12/1992 | Grossa et al. |
| 5,176,188 A | 1/1993 | Quinn et al. |
| 5,182,055 A | 1/1993 | Allison et al. |
| 5,182,056 A | 1/1993 | Spence et al. |
| 5,182,134 A | 1/1993 | Sato |
| 5,182,715 A | 1/1993 | Vorgitch et al. |
| 5,183,598 A | 2/1993 | Helle et al. |
| 5,184,307 A | 2/1993 | Hull et al. |
| 5,192,469 A | 3/1993 | Smalley et al. |
| 5,192,559 A | 3/1993 | Hull et al. |
| 5,198,159 A | 3/1993 | Nakamura et al. |
| 5,203,944 A | 4/1993 | Prinz et al. |
| 5,204,055 A | 4/1993 | Sachs et al. |
| 5,204,124 A | 4/1993 | Secretan et al. |
| 5,204,823 A | 4/1993 | Schlotterbeck |
| 5,207,371 A | 5/1993 | Prinz et al. |
| 5,209,878 A | 5/1993 | Smalley et al. |
| 5,216,616 A | 6/1993 | Masters |
| 5,217,653 A | 6/1993 | Mashinsky et al. |
| 5,234,636 A | 8/1993 | Hull et al. |
| 5,236,637 A | 8/1993 | Hull |
| 5,236,812 A | 8/1993 | Vassiliou et al. |
| 5,238,614 A | 8/1993 | Uchinono et al. |
| 5,238,639 A | 8/1993 | Vinson et al. |
| 5,247,180 A | 9/1993 | Mitcham et al. |
| 5,248,249 A | 9/1993 | Yamamoto et al. |
| 5,248,456 A | 9/1993 | Evans, Jr. et al. |
| 5,252,264 A | 10/1993 | Forderhase et al. |
| 5,256,340 A | 10/1993 | Allison et al. |
| 5,258,146 A | 11/1993 | Almquist et al. |
| 5,260,009 A | 11/1993 | Penn |
| 5,263,130 A | 11/1993 | Pomerantz et al. |
| 5,264,061 A | 11/1993 | Juskey et al. |
| 5,267,013 A | 11/1993 | Spence |
| 5,273,581 A | 12/1993 | Koslowski et al. |
| 5,273,691 A | 12/1993 | Hull et al. |
| 5,275,916 A | 1/1994 | Kato et al. |
| 5,278,442 A | 1/1994 | Prinz et al. |
| 5,279,665 A | 1/1994 | Yunovich et al. |
| 5,281,789 A | 1/1994 | Merz et al. |
| 5,286,573 A | 2/1994 | Prinz et al. |
| 5,287,435 A | 2/1994 | Cohen et al. |
| 5,289,214 A | 2/1994 | Zur et al. |
| 5,296,062 A | 3/1994 | Bourell et al. |
| 5,296,335 A | 3/1994 | Thomas et al. |
| 5,301,415 A | 4/1994 | Prinz et al. |
| 5,303,141 A | 4/1994 | Batchelder et al. |
| 5,306,446 A | 4/1994 | Howe |
| 5,306,447 A | 4/1994 | Marcus et al. |
| 5,316,580 A | 5/1994 | Deckard |
| 5,328,539 A | 7/1994 | Sato |
| 5,338,611 A | 8/1994 | Lause et al. |
| 5,340,433 A | 8/1994 | Crump |
| 5,340,656 A | 8/1994 | Sachs et al. |
| 5,342,566 A | 8/1994 | Schafer et al. |
| 5,342,919 A | 8/1994 | Dickens, Jr. et al. |
| 5,344,298 A | 9/1994 | Hull |

| | | | | | |
|---|---|---|---|---|---|
| 5,345,391 A | 9/1994 | Hull et al. | 5,587,913 A | 12/1996 | Abrams et al. |
| 5,345,414 A | 9/1994 | Nakamura et al. | 5,591,563 A | 1/1997 | Suzuki et al. |
| 5,348,693 A | 9/1994 | Taylor et al. | 5,593,531 A | 1/1997 | Penn |
| 5,352,310 A | 10/1994 | Natter | 5,594,652 A | 1/1997 | Penn et al. |
| 5,352,405 A | 10/1994 | Beaman et al. | 5,595,597 A | 1/1997 | Fogel et al. |
| 5,355,318 A | 10/1994 | Dionnet et al. | 5,595,703 A | 1/1997 | Swaelens et al. |
| 5,358,673 A | 10/1994 | Heller et al. | 5,596,504 A | 1/1997 | Tata et al. |
| 5,364,889 A | 11/1994 | Quinn et al. | 5,597,520 A | 1/1997 | Smalley et al. |
| 5,365,996 A | 11/1994 | Crook | 5,597,589 A | 1/1997 | Deckard |
| 5,370,692 A | 12/1994 | Fink et al. | 5,598,340 A | 1/1997 | Medard et al. |
| 5,376,320 A | 12/1994 | Tiefenbacher et al. | 5,599,651 A | 2/1997 | Steinmann et al. |
| 5,382,289 A | 1/1995 | Bambauer et al. | 5,603,797 A | 2/1997 | Thomas et al. |
| 5,382,308 A | 1/1995 | Bourell et al. | 5,605,941 A | 2/1997 | Steinmann et al. |
| 5,385,772 A | 1/1995 | Slovinsky et al. | 5,608,814 A | 3/1997 | Gilmore et al. |
| 5,386,500 A | 1/1995 | Pomerantz et al. | 5,609,812 A | 3/1997 | Childers et al. |
| 5,387,380 A | 2/1995 | Cima et al. | 5,609,813 A | 3/1997 | Allison et al. |
| 5,391,072 A | 2/1995 | Lawton et al. | 5,610,824 A | 3/1997 | Vinson et al. |
| 5,391,460 A | 2/1995 | Dougherty et al. | 5,611,883 A | 3/1997 | Tompkins et al. |
| 5,393,613 A | 2/1995 | MacKay | 5,614,075 A | 3/1997 | Andre, Sr. |
| 5,402,351 A | 3/1995 | Batchelder et al. | 5,616,293 A | 4/1997 | Ashtiani-Zarandi et al. |
| 5,415,820 A | 5/1995 | Furuta et al. | 5,616,294 A | 4/1997 | Deckard |
| 5,418,112 A | 5/1995 | Mirle et al. | 5,622,577 A | 4/1997 | O'Connor |
| 5,426,722 A | 6/1995 | Batchelder | 5,622,811 A | 4/1997 | Ogue et al. |
| 5,429,788 A | 7/1995 | Ribble et al. | 5,626,919 A | 5/1997 | Chapman et al. |
| 5,429,908 A | 7/1995 | Hokuf et al. | 5,630,981 A | 5/1997 | Hull |
| 5,430,666 A | 7/1995 | DeAngelis et al. | 5,632,848 A | 5/1997 | Richards et al. |
| 5,432,045 A | 7/1995 | Narukawa et al. | 5,633,021 A | 5/1997 | Brown et al. |
| 5,433,280 A | 7/1995 | Smith | 5,637,169 A | 6/1997 | Hull et al. |
| 5,435,902 A | 7/1995 | Andre, Sr. | 5,637,175 A | 6/1997 | Feygin et al. |
| 5,437,964 A | 8/1995 | Lapin et al. | 5,639,070 A | 6/1997 | Deckard |
| 5,439,622 A | 8/1995 | Pennisi et al. | 5,639,402 A | 6/1997 | Barlow et al. |
| 5,447,822 A | 9/1995 | Hull et al. | 5,639,413 A | 6/1997 | Crivello |
| 5,450,205 A | 9/1995 | Sawin et al. | 5,640,667 A | 6/1997 | Freitag et al. |
| 5,458,825 A | 10/1995 | Grolman et al. | 5,641,448 A | 6/1997 | Yeung et al. |
| 5,460,758 A | 10/1995 | Langer et al. | 5,645,973 A | 7/1997 | Hofmann et al. |
| 5,461,088 A | 10/1995 | Wolf et al. | 5,648,450 A | 7/1997 | Dickens, Jr. et al. |
| 5,468,886 A | 11/1995 | Steinmann et al. | 5,649,277 A | 7/1997 | Greul et al. |
| 5,470,689 A | 11/1995 | Wolf et al. | 5,650,260 A | 7/1997 | Onishi et al. |
| 5,474,719 A | 12/1995 | Fan et al. | 5,651,934 A | 7/1997 | Almquist et al. |
| 5,482,659 A | 1/1996 | Sauerhoefer | 5,653,925 A | 8/1997 | Batchelder |
| 5,490,882 A | 2/1996 | Sachs et al. | 5,656,230 A | 8/1997 | Khoshevis |
| 5,490,962 A | 2/1996 | Cima et al. | 5,658,412 A | 8/1997 | Retallick et al. |
| 5,491,643 A | 2/1996 | Batchelder | 5,658,712 A | 8/1997 | Steinmann et al. |
| 5,494,618 A | 2/1996 | Sitzmann et al. | 5,659,478 A | 8/1997 | Pennisi et al. |
| 5,495,029 A | 2/1996 | Steinmann et al. | 5,660,621 A | 8/1997 | Bredt |
| 5,495,328 A | 2/1996 | Spence et al. | 5,660,900 A | 8/1997 | Andersen et al. |
| 5,498,782 A | 3/1996 | Rex | 5,663,883 A | 9/1997 | Thomas et al. |
| 5,500,069 A | 3/1996 | Ogue et al. | 5,665,401 A | 9/1997 | Serbin et al. |
| 5,501,824 A | 3/1996 | Almquist et al. | 5,667,820 A | 9/1997 | Heller et al. |
| 5,503,785 A | 4/1996 | Crump et al. | 5,672,312 A | 9/1997 | Almquist et al. |
| 5,503,793 A | 4/1996 | Uchinono et al. | 5,674,921 A | 10/1997 | Regula et al. |
| 5,506,046 A | 4/1996 | Andersen et al. | 5,676,904 A | 10/1997 | Almquist et al. |
| 5,506,087 A | 4/1996 | Lapin et al. | 5,677,107 A | 10/1997 | Neckers |
| 5,506,607 A | 4/1996 | Sanders, Jr. et al. | 5,684,713 A | 11/1997 | Asada et al. |
| 5,507,336 A | 4/1996 | Tobin | 5,688,464 A | 11/1997 | Jacobs et al. |
| 5,510,226 A | 4/1996 | Lapin et al. | 5,693,144 A | 12/1997 | Jacobs et al. |
| 5,512,162 A | 4/1996 | Sachs et al. | 5,695,707 A | 12/1997 | Almquist et al. |
| 5,514,232 A | 5/1996 | Burns | 5,697,043 A | 12/1997 | Baskaran et al. |
| 5,514,378 A | 5/1996 | Mikos et al. | 5,698,485 A | 12/1997 | Bruck et al. |
| 5,518,680 A | 5/1996 | Cima et al. | 5,700,406 A | 12/1997 | Menhennett et al. |
| 5,519,816 A | 5/1996 | Pomerantz et al. | 5,703,138 A | 12/1997 | Cantor et al. |
| 5,525,051 A | 6/1996 | Takano et al. | 5,705,116 A | 1/1998 | Sitzmann et al. |
| 5,527,877 A | 6/1996 | Dickens, Jr. et al. | 5,705,117 A | 1/1998 | O'Connor et al. |
| 5,534,059 A | 7/1996 | Immordino, Jr. | 5,705,316 A | 1/1998 | Steinmann et al. |
| 5,534,104 A | 7/1996 | Langer et al. | 5,707,578 A | 1/1998 | Johnson et al. |
| 5,536,467 A | 7/1996 | Reichle et al. | 5,707,780 A | 1/1998 | Lawton et al. |
| 5,545,367 A | 8/1996 | Bae et al. | 5,711,911 A | 1/1998 | Hull |
| 5,554,336 A | 9/1996 | Hull | 5,713,410 A | 2/1998 | LaSalle et al. |
| 5,555,176 A | 9/1996 | Menhennett et al. | 5,717,599 A | 2/1998 | Menhennett et al. |
| 5,555,481 A | 9/1996 | Rock et al. | 5,718,279 A | 2/1998 | Satoh et al. |
| 5,556,590 A | 9/1996 | Hull | 5,718,757 A | 2/1998 | Guillou et al. |
| 5,569,349 A | 10/1996 | Almquist et al. | 5,727,138 A | 3/1998 | Harada et al. |
| 5,569,431 A | 10/1996 | Hull | 5,728,345 A | 3/1998 | Hlavaty et al. |
| 5,571,471 A | 11/1996 | Hull | 5,730,817 A | 3/1998 | Feygin et al. |
| 5,572,431 A | 11/1996 | Brown et al. | 5,730,925 A | 3/1998 | Mattes et al. |
| 5,573,721 A | 11/1996 | Gillette | 5,731,388 A | 3/1998 | Suzuki et al. |
| 5,573,722 A | 11/1996 | Hull | 5,733,497 A | 3/1998 | McAlea et al. |
| 5,573,889 A | 11/1996 | Hofmann et al. | 5,738,817 A | 4/1998 | Danforth et al. |
| 5,582,876 A | 12/1996 | Langer et al. | 5,738,921 A | 4/1998 | Andersen et al. |

| | | |
|---|---|---|
| 5,740,051 A | 4/1998 | Sanders, Jr. et al. |
| 5,746,844 A | 5/1998 | Sterett et al. |
| 5,746,967 A | 5/1998 | Hoy et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,772,947 A | 6/1998 | Hull et al. |
| 5,783,358 A | 7/1998 | Schulthess et al. |
| 5,800,756 A | 9/1998 | Andersen et al. |
| 5,805,971 A | 9/1998 | Akedo et al. |
| 5,851,465 A | 12/1998 | Bredt |
| 5,870,307 A | 2/1999 | Hull et al. |
| 5,902,441 A | 5/1999 | Bredt et al. |
| 5,902,537 A | 5/1999 | Almquist et al. |
| 5,940,674 A | 8/1999 | Sachs et al. |
| 5,943,235 A | 8/1999 | Earl et al. |
| 5,948,874 A | 9/1999 | Pike et al. |
| 5,965,776 A | 10/1999 | Leppard et al. |
| 5,976,339 A | 11/1999 | Andre, Sr. |
| 6,007,318 A | 12/1999 | Russell et al. |
| 6,071,675 A | 6/2000 | Teng |
| 6,077,887 A | 6/2000 | Thuresson |
| 6,112,109 A | 8/2000 | D'Urso et al. |
| 6,136,088 A | 10/2000 | Farrington |
| 6,136,948 A | 10/2000 | Dickens, Jr. et al. |
| 6,147,138 A | 11/2000 | Hochsmann et al. |
| 6,193,922 B1 | 2/2001 | Ederer et al. |
| 6,243,616 B1 | 6/2001 | Droscher et al. |
| 6,299,677 B1 | 10/2001 | Johnson et al. |
| 6,348,679 B1 | 2/2002 | Ryan et al. |
| 6,363,606 B1 | 4/2002 | Johnson, Jr. et al. |
| 6,375,874 B1 | 4/2002 | Russell et al. |
| 6,378,974 B1 | 4/2002 | Oelbrandt et al. |
| 6,397,922 B1 | 6/2002 | Sachs et al. |
| 6,401,001 B1 | 6/2002 | Jang et al. |
| 6,403,002 B1 | 6/2002 | van der Geest et al. |
| 6,416,850 B1 | 7/2002 | Bredt et al. |
| 6,423,255 B1 | 7/2002 | Hoechsmann et al. |
| 6,433,038 B1 | 8/2002 | Tanabe et al. |
| 6,531,086 B1 | 3/2003 | Larsson et al. |
| 6,540,784 B2 | 4/2003 | Barlow et al. |
| 6,600,142 B2 | 7/2003 | Ryan et al. |
| 6,610,429 B2 | 8/2003 | Bredt et al. |
| 6,713,125 B1 | 3/2004 | Sherwood et al. |
| 6,740,423 B2 | 5/2004 | Murase |
| 6,742,456 B1 | 6/2004 | Kasperchik et al. |
| 6,780,368 B2 | 8/2004 | Liu et al. |
| 6,799,959 B1 | 10/2004 | Tochimoto et al. |
| 6,884,311 B1 | 4/2005 | Dalvey et al. |
| 6,930,144 B2 | 8/2005 | Oriakhi |
| 6,989,115 B2 | 1/2006 | Russell et al. |
| 7,037,382 B2 | 5/2006 | Davidson et al. |
| 7,049,363 B2 | 5/2006 | Shen |
| 7,087,109 B2 | 8/2006 | Bredt et al. |
| 7,120,512 B2 | 10/2006 | Kramer et al. |
| 7,285,234 B2 | 10/2007 | Pfeifer et al. |
| 7,300,613 B2 | 11/2007 | Sano et al. |
| 7,332,537 B2 | 2/2008 | Bredt et al. |
| 7,674,423 B2 | 3/2010 | Sano |
| 2001/0014402 A1 | 8/2001 | Murase |
| 2001/0050031 A1 | 12/2001 | Bredt et al. |
| 2002/0106412 A1 | 8/2002 | Rowe et al. |
| 2003/0054218 A1 | 3/2003 | Hampden-Smith et al. |
| 2003/0090034 A1 | 5/2003 | Mulhaupt et al. |
| 2003/0143268 A1 | 7/2003 | Pryce et al. |
| 2003/0173695 A1 | 9/2003 | Monkhouse et al. |
| 2004/0038009 A1 | 2/2004 | Leyden et al. |
| 2004/0056378 A1* | 3/2004 | Bredt et al. .............. 264/109 |
| 2004/0062814 A1 | 4/2004 | Rowe et al. |
| 2004/0166187 A1 | 8/2004 | Fong |
| 2004/0173946 A1 | 9/2004 | Pfeifer et al. |
| 2004/0232583 A1 | 11/2004 | Monsheimer et al. |
| 2005/0001356 A1 | 1/2005 | Tochimoto et al. |
| 2005/0003189 A1 | 1/2005 | Bredt et al. |
| 2005/0017394 A1 | 1/2005 | Hochsmann et al. |
| 2005/0049739 A1 | 3/2005 | Kramer et al. |
| 2005/0059757 A1 | 3/2005 | Bredt et al. |
| 2005/0080191 A1 | 4/2005 | Kramer et al. |
| 2005/0093194 A1 | 5/2005 | Oriakhi et al. |
| 2005/0104241 A1 | 5/2005 | Kritchman et al. |
| 2005/0110177 A1 | 5/2005 | Schulman et al. |
| 2005/0179167 A1 | 8/2005 | Hachikian |
| 2005/0197431 A1 | 9/2005 | Bredt et al. |
| 2005/0212163 A1 | 9/2005 | Bausinger et al. |
| 2005/0230870 A1 | 10/2005 | Oriakhi |
| 2006/0071367 A1 | 4/2006 | Hunter et al. |
| 2006/0141145 A1 | 6/2006 | Davidson et al. |
| 2006/0208388 A1 | 9/2006 | Bredt et al. |
| 2006/0230984 A1 | 10/2006 | Bredt et al. |
| 2007/0007698 A1 | 1/2007 | Sano |
| 2007/0029698 A1 | 2/2007 | Rynerson et al. |
| 2007/0135531 A1 | 6/2007 | Norcini et al. |
| 2007/0241482 A1 | 10/2007 | Giller et al. |
| 2008/0138515 A1* | 6/2008 | Williams .............. 427/222 |
| 2008/0281019 A1 | 11/2008 | Giller et al. |
| 2011/0103489 A1 | 5/2011 | Takada |

FOREIGN PATENT DOCUMENTS

| | | |
|---|---|---|
| CN | 1857930 | 8/2006 |
| DE | 3048506 A1 | 7/1982 |
| DE | 4012044 | 10/1991 |
| DE | 19727677 | 1/1999 |
| DE | 19853834 | 5/2000 |
| DE | 10158233 | 3/2003 |
| EP | 0431924 | 6/1991 |
| EP | 0540203 | 5/1993 |
| EP | 1226019 B1 | 7/2002 |
| EP | 1475221 A | 11/2004 |
| EP | 1491517 | 12/2004 |
| EP | 1 498 277 A | 1/2005 |
| EP | 1 512 519 | 3/2005 |
| EP | 1 623 816 A | 2/2006 |
| GB | 2048235 A | 12/1980 |
| GB | 2155944 A | 10/1985 |
| JP | 56-096762 A | 8/1981 |
| JP | 62260754 A | 11/1987 |
| JP | 02-307730 A | 12/1990 |
| JP | 3287683 | 12/1991 |
| JP | 5-25898 | 2/1993 |
| JP | 06289612 | 10/1994 |
| JP | 08-192468 A | 7/1996 |
| JP | 9241311 | 9/1997 |
| JP | 10-182904 A | 7/1998 |
| JP | 11116875 | 4/1999 |
| JP | 2001162351 | 6/2001 |
| JP | 2001-207584 A | 8/2001 |
| JP | 2001-15613 | 7/2002 |
| WO | WO-93/19019 A | 9/1993 |
| WO | WO-93/20112 A1 | 10/1993 |
| WO | WO-93/25336 | 12/1993 |
| WO | WO-9412328 | 6/1994 |
| WO | WO-94/20274 A1 | 9/1994 |
| WO | WO-9530503 | 11/1995 |
| WO | WO-9606881 | 3/1996 |
| WO | WO-9711835 | 4/1997 |
| WO | WO-9726302 | 7/1997 |
| WO | WO-97/32671 | 9/1997 |
| WO | WO-98/09798 A1 | 3/1998 |
| WO | WO-9809798 | 3/1998 |
| WO | WO-9828124 | 7/1998 |
| WO | WO-01/78969 A2 | 10/2001 |
| WO | WO-0238677 | 5/2002 |
| WO | WO-02064354 | 8/2002 |
| WO | WO-03016030 | 2/2003 |
| WO | WO-2004048463 | 6/2004 |
| WO | WO-2004062927 | 7/2004 |
| WO | WO-2004096514 | 11/2004 |
| WO | WO-2004/113042 A2 | 12/2004 |
| WO | WO-2005011959 | 2/2005 |
| WO | WO-2005-023524 A | 3/2005 |
| WO | WO-2005025074 | 3/2005 |
| WO | WO-2005090055 | 9/2005 |
| WO | WO-2005105412 | 11/2005 |
| WO | WO-2007039450 | 4/2007 |
| WO | WO-2007/147625 A2 | 12/2007 |

OTHER PUBLICATIONS

Examination report for European patent Application No. 05024830. 1, mailed Mar. 5, 2010 (4 pages).
Office Action in Japanese Patent Application No. 2000-579442, mailed Sep. 8, 2009, 3 pages) (translation).
Office Action in Japanese Patent Application No. 2004-540142, mailed Feb. 16, 2010, 6 pages) (translation).
Office Action in European Patent Application No. 04752633.0, mailed Jun. 11, 2010, 4 pages).
Office Action in European Patent Application No. 04001558.8, mailed Jun. 10, 2010, 5 pages).
Office Action in Japanese Patent Application No. 2001-536349, mailed Jun. 1, 2010, 3 pages). (translation).
Office Action in Japanese Patent Application No. 2000-579442, mailed May 11, 2010, 5 pages).
Office Action in European Patent Application No. 01927008.1, mailed Oct. 1, 2009, 4 pages).
4,937,420, Jun. 26, 1009, Deckard.
Adamson, Physical Chemistry of Surfaces, Interscience Publishers, Inc. (1967).
Borland, "Characterization of Fundamental and Reticulated Biomedical Polymer Structures Fabricated by Three Dimensional Printing," Thesis, MIT, Jun. 1995.
Boyer et al., eds., "Metals Handbook," American Society for Metals, pp. 23.5, 23.8-23.13, (1985).
Brandup et al., Polymer Handbook, pp. 675-714, John Wiley & Sons (1999).
Definition of "Colorant," Hawley's Condensed Chemical Dictionary, 14th Ed. (2001) p. 287.
Ederer, "A 3D Print Process for Inexpensive Plastic Parts," Presentation for the Austin Solid Freeform Conference, 1995.
European Search Report for European Application No. 03029489.6, Feb. 16, 2004, 3 pgs.
European Search Report for European Application No. 04001558, Apr. 27, 2006, 5 pgs.
Examination report for European Application No. 01 927 008.1, mailed Jan. 23, 2008, 7 pages.
Examination report for European Application No. 00 976 896.1-2307, Jan. 28, 2003 (5 pages).
Examination report in Canadian Patent Application No. 2,338,617, mailed Aug. 17, 2007 (2 pages).
German, Powder Injection Molding, 1990, .6. 32-43 and 92-95.
Grant, Julius, Editor, "Hackh's Chemical Dictionary" Fourth Edition (1972, McGraw-Hill Book Company, New York), p. 250, "ethyl acetate."
Hamill, Search Report dated Jan. 30, 2008, 2 pages.
International Preliminary Examination Report for International Application No. PCT/US01/12220, Mar. 14, 2003.
International Preliminary Examination Report for International Application No. PCT/US97/15041, Oct. 19, 1998, 9 pages.
International Preliminary Report on Patentability for International Application No. PCT/US2004/027549 (Dec. 6, 2007).
International Preliminary Report on Patentability for International Application No. PCT/US2004/015644, Nov. 25, 2005, 6 pgs.
International Search Report & Written Opinion for International Application No. PCT/US2007/008046, Nov. 15, 2007, 23 pages.
International Search Report & Written Opinion for International Application No. PCT/US2007/025075, mailed Jun. 12, 2008.
International Search Report and Written Opinion for International Application No. PCT/US2004/027549.
International Search Report for International Application No. PCT/US03/29714, Feb. 10, 2004, 4 pages.
International Search Report for International Application No. PCT/US97/15041, Jan. 12, 1998, 4 pgs.
International Search Report for International Application No. PCT/US99/20628, Jan. 21, 2000, 3 pages.
International Search Report of International Application No. PCT/US01/12220, Apr. 15, 2002.
International search Report of International Application No. PCT/US04/015644, Oct. 24, 2005.
Invitation to Pay Additional Fees & Partial ISR for International Application No. PCT/US2007/008046, Sep. 18, 2007 (6 pages).

Khanuja, "Origin and Control of Anisotropy in Three Dimensional Printing of Structural Ceramics," Thesis, MIT, Feb. 1996.
Knapczyk, "Polyallyl Glycidyl Ether Resins for Very Fast Curing High Performance Coatings," 65th Ann. Meeting of Feder. of Soc. for Coating Tech., Oct. 1987, 16 pages.
Office Action in Japanese Patent Application No. 549079/98, mailed Nov. 27, 2007, 3 pages.
Office Action in The People's Republic of China, Application No. 200480018360, Oct. 13, 2006, 5pages.
Official Action from Canadian Intellectual Property Office for Canadian Serial No. 2,388,046, dated Apr. 10, 2006.
Pizzi et al., Handbook of Adhesive Technology, pp. 761-773, Marcel Dekker, Inc. (2003).
Rulison, "Wettability Studies for Porous Solids Including Powders and Fibrous Materials-Technical Notice # 302," (1996).
Written Opinion for International Application No. PCT/US99/20628, Jul. 27, 2000, 10 pages.
Aranson et al., The Physics of Granular Media, H. Hinrichsen & D. Wolf, eds, Wiley-VCH.(2004) pp. 146-147.
Das, B.M., Advanced Soil Mechanics, Hemisphere Pr., (1997) pp. 315-317.
Hamill, Search Report for U.S. Appl. No. 11/972,485, dated Jan. 4, 2008, 3 pages.
http://toxics.usgs.gov/definitions/kow.html, printed Jun. 24, 2008.
http://www.cibasc.com/brightening.htm printed Jun. 24, 2008.
http://www.devicelink.com/mddi/archive/99/09/006.html, printed Jun. 24, 2008.
International Preliminary Report on Patentability for Intl. Application No. PCT/US2008/000366, mailed Jul. 23, 2009 (12 pages).
International Preliminary Report on Patentability for Intl. Application No. PCT/US2007/025075, mailed Jun. 18, 2009 (9 pages).
Examination report for European patent Application No. 04 752 633.0, mailed Apr. 22, 2009 (3 pages).
Examination report for European patent Application No. 01 927 008.1, mailed May 11, 2009 (3 pages).
International Search Report and Written Opinion for PCT/US2008/002362, mailed Nov. 11, 2008 (16 pages).
International Preliminary Report on Patentability for PCT/US2007/008046, mailed Oct. 8, 2008 (14 pages).
International Search Report and Written Opinion for PCT/US2008/000366, mailed Jun. 20, 2008.
Office Action in Japanese Patent Application No. 549079/98, mailed Mar. 24, 2009, 2 pages. (translation).
Examination report for European patent Application No. 03759353.0, dated Oct. 27, 2005, 5 pages.
Examination report for European patent Application No. 03759353.0, dated Jun. 21, 2007, 3 pages.
Examination report for European patent Application No. 03759353.0, dated Mar. 25, 2008, 7 pages.
Examination report for European patent Application No. 03759353.0, dated Nov. 21, 2008, 4 pages.
Examination report for European patent Application No. 05024830.1, mailed Jan. 23, 2009, 8 pages.
Office Action in European Patent Application No. 04001558.8, mailed Oct. 2, 2009, 3 pages.
Office Action in Japanese Patent Application No. 2006-533208, mailed Nov. 10, 2009, 4 pages. (translation).
Examination report for European patent Application No. 05024830.1, mailed Jan. 27, 2011 (5 pages).
Office Action in Chinese Patent Application No. 200780048035.0, mailed Sep. 23, 2011, 12 pages.
Office Action in Chinese Patent Application No. 200880005474.8, mailed Aug. 16, 2011, 9 pages.
Office Action in Japanese Patent Application No. 2001-576254, Mar. 22, 2011, 6 pages.
Office Action in Japanese Patent Application No. 2000-579442, mailed Jul. 19, 2011, 10 pages. (with translation).
Office Action in Japanese Patent Application No. 2001-576254, Jul. 19, 2011, 3 pages.
Office Action in Japanese Patent Application No. 2001-576254, issued Oct. 25, 2011.
Office Action in Korean Patent Application No. Oct. 2011-7007842, Jul. 8, 2011, 6 pages.

* cited by examiner (1) INITIATION (2) PROPAGATION (3) TERMINATION

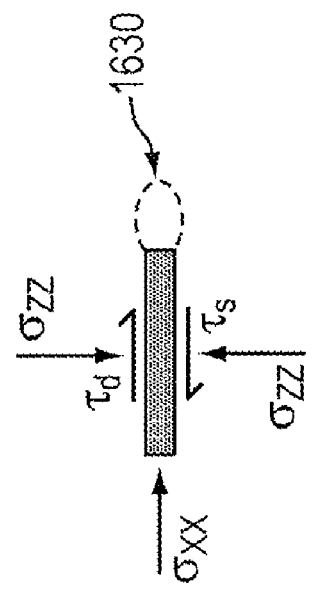
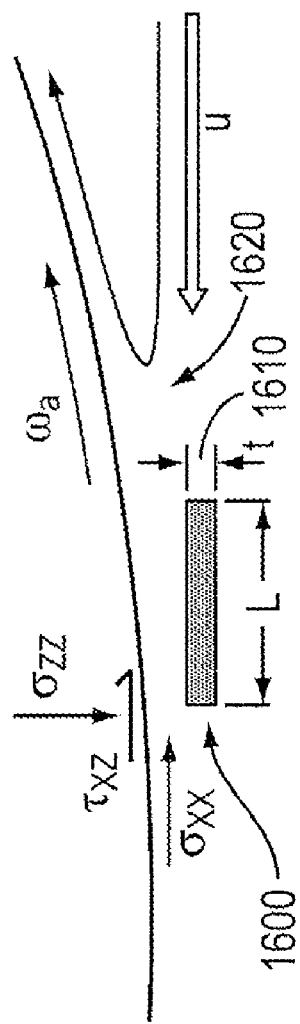
FIG. 16B
FIG. 16A

THREE-DIMENSIONAL PRINTING MATERIAL SYSTEM WITH IMPROVED COLOR, ARTICLE PERFORMANCE, AND EASE OF USE

RELATED APPLICATION

This application claims the benefit of and priority to U.S. Provisional Application Ser. No. 60/879,703 filed Jan. 10, 2007, the disclosure of which is hereby incorporated by reference in its entirety.

BACKGROUND

The field of rapid prototyping involves the production of prototype articles and small quantities of functional parts, as well as structural ceramics and ceramic shell molds for metal casting, directly from computer-generated design data.

Two well-known methods for rapid prototyping include a selective laser sintering process and a liquid binder three-dimensional printing process. These techniques are similar, to the extent that they both use layering techniques to build three-dimensional articles. Both methods form successive thin cross-sections of the desired article. The individual cross-sections are formed by bonding together adjacent grains of a granular, i.e., particulate, material on a generally planar surface of a bed of the granular material. Each layer is bonded to a previously formed layer to form the desired three-dimensional article at the same time as the grains of each layer are bonded together. The laser-sintering and liquid binder techniques are advantageous, because they create parts directly from computer-generated design data and can produce parts having complex geometries. Moreover, three-dimensional printing can be quicker and less expensive than machining of prototype parts or production of cast or molded parts by conventional "hard" or "soft" tooling techniques that can take from a few weeks to several months, depending on the complexity of the item.

An early three-dimensional printing technique, described in U.S. Pat. No. 5,204,055, incorporated herein by reference in its entirety, describes the use of an ink-jet style printing head to deliver a liquid or colloidal binder material to sequentially applied layers of powdered material. The three-dimensional ink-jet printing technique or liquid binder method involves applying a layer of a powdered material to a surface using a counter-roller. After the powdered material is applied to the surface, the ink-jet print head delivers a liquid binder in a predetermined pattern to the layer of powder. The binder infiltrates into gaps in the powder material and hardens to bond the powder material into a solidified layer. The hardened binder also bonds each layer to the previous layer. After the first cross-sectional portion is formed, the previous steps are repeated, building successive cross-sectional portions until the final article is formed. Optionally, an adhesive can be suspended in a carrier that evaporates, leaving the hardened adhesive behind. The powdered material may be ceramic, metal, plastic or a composite material, and may also include fibers. The liquid binder material may be organic or inorganic. Typical organic binder materials used are polymeric resins or ceramic precursors, such as polycarbosilazane. Inorganic binders are used where the binder is incorporated into the final articles; silica is typically used in such an application.

Existing 3D printing materials offer fast, low cost methods for producing prototypes and concept models. Three-dimensional printing enables the formation of full color three-dimensional parts in one production operation. Many existing materials, however, have drawbacks, such as low handling strength, the need for the user to infiltrate the green part (i.e., as made by the machine) to increase strength, and the quality of the color created.

Color accuracy during three-dimensional printing affects the utility of a product. As color quality approaches that of the computer screen, designers, architects, etc., can create computer files, put the labels and shading directly on the model, and skip the steps of printing and applying labels, having the models painted, etc. One aspect of color accuracy, similar to paper printing, is the requirement to have a bright, white, neutral substrate. In three-dimensional printing (also referred to herein as "3D printing"), the models have much higher porosity than paper printing, and the substrates are not prepared in a layered fashion prior, then dried, prior to applying the inks. It is necessary to choose appropriate starting materials, i.e., powder, ink, and infiltrant, so that they combine to form a white part or article in their reacted state in order to create a high quality color part. It is not sufficient to merely include a high dose of any white pigment to achieve the brighter white. Loading a powder formula with white pigment does increase the whiteness of a printed part, but at the cost of a loss of the darker, more saturated color in the gamut.

Another feature of existing three-dimensional printed articles, especially those made out of plaster-based systems such as Z Corporation's zp130, is that the performance of the final, infiltrated strength of the article may vary with ambient conditions and the viscosity of the infiltrant. One common infiltrant is Z Corporation's zbond101, a cyanoacrylate-based adhesive. Similar products are made by many companies, such as Loctite. Penetration of the infiltrant can be reduced in humid conditions where printed parts do not fully dry, or when the infiltrant has aged (therefore increased in viscosity). Reduced penetration leads to an effectively weaker prototype. The variability in performance may also be a source of frustration, as a user may be able to use his prototypes for his application during one art of the year, but not during another.

SUMMARY OF THE INVENTION

Embodiments of the invention may include one or more of the following features. First, improvements to the powder system allow the creation of whiter three-dimensional articles by the inclusion of selected whitening agents. Second, a fluid for activating the three-dimensional printing powder includes an optical brightening agent that helps to correct the white point of the powder system, without compromising the deeper colors. Third, the addition of ingredients to inhibit the curing of infiltrants during the impregnation process allows for the creation of a stronger, more durable prototype. Finally, more careful selection of grain size allows for high green part strength, final infiltrated article strength, and improved mechanical behavior of the unreacted powder during the three-dimensional printing process. These features allow the creation of three-dimensional printed parts that are strong, have good color, have sharp feature definition, and enable a consistent user experience.

In an aspect, embodiments of the invention include a powder adapted for three-dimensional printing. The powder includes a loose, dry, and substantially free-flowing particulate mixture including a water-soluble adhesive, plaster, a plaster accelerator, a whitening agent having an L* of at least about 90 and a C* of up to about 5.5, and a solid particulate additive including an acid. The particulate material is adapted for use in three-dimensional printing to form an article comprised of a plurality of layers, the layers including a reaction product of the particulate material and an aqueous fluid that contacts the particulate material during three-dimensional printing. The acid has a water solubility selected from a range of about 0-20 g/100 mL of water, a pKa selected from a range about 1 to about 4, and a $K_{ow}$ selected from a range of about −0.4 to about 1, and is adapted for modifying a cure rate of an infiltrant to facilitate penetration of the infiltrant into the article. The particulate mixture is substantially free of plaster retarders.

One or more of the following features may be included. The substantially dry particulate mixture may have a Bredt parameter of at least about 0.10. An internal angle of friction of the particulate material may have a value selected from a range of 40° to 70°. The particulate mixture may include about 0.01% to about 5% by weight of the whitening agent. A refractive index of the whitening agent may be at least about 1.9. The whitening agent may have a solubility in an aqueous solution of 5 wt % glycerol of at least about 5 mg/liter. The whitening agent may include a second water-soluble adhesive and/or may be a high whiteness starch or a high whiteness starch derivative. The whitening agent may be insoluble in an aqueous solution of 5 wt % glycerol. The whitening agent may include or consist essentially or zinc oxide, titanium dioxide, hollow glass spheres, limestone, a clay, and combinations thereof.

The water-soluble adhesive may include or consist essentially of polyvinyl alcohol. The pKa may be about 3 and the $K_{ow}$ may be selected from a range of about −0.5 to about 0.5. The particulate mixture may include about 0.01% to about 5% by weight of the solid particulate additive. The solid particulate additive may include or consist essentially of fumaric acid, tartaric acid, gluconic acids, adipic acid, glucono-delta-lactone (GdL), ethylenediaminetetraacetic acid, succinic acid, a phenolic compound, and combinations thereof.

The plaster may include or consist essentially of plaster of paris, sulphate of lime, hydrated calcium sulphate, dental plaster, $CaSO_4 \cdot \frac{1}{2}H_2O$, $CaSO_4 \cdot 2H_2O$, and combinations thereof. The plaster accelerator may include or consist essentially of hydrated gypsum, potassium sulfate, potassium aluminum sulfate, and combinations thereof. The solid particulate additive may not be a catalyst affecting a rate of a reaction between the plaster and the aqueous fluid.

In another aspect, embodiments of the invention include an aqueous fluid for activating water soluble components of a three-dimensional printing powder. The aqueous fluid includes water, a humectant, a surfactant, a preservative, and about 0.05- about 5 wt % of an optical brightening agent. The fluid is substantially clear, has a viscosity selected from a range of 1-1.35 cps, a surface tension selected from a range of 30-36 dynes/cm, and a pH selected from a range of 4.9 to 10.3

The optical brightening agent may include a fluorescent brightener based on stilbene chemistry or distyrylbiphenyl.

In still another aspect, embodiments of the invention include a kit. The kit includes a powder adapted for three-dimensional printing and an aqueous fluid for activating water soluble components of the powder. In particular, the powder includes a loose, dry, and substantially free-flowing particulate mixture including a water-soluble adhesive, plaster, a plaster accelerator, a whitening agent having an L* of at least about 90 and a C* of up to about 5.5, and a solid particulate additive including an acid. The aqueous fluid includes water, a humectant, a surfactant, a preservative, and about 0.05—about 5 wt % of an optical brightening agent. The particulate material is adapted for use in three-dimensional printing to form an article comprised of a plurality of layers, the layers including a reaction product of the particulate material and the aqueous fluid that contacts the particulate material during three-dimensional printing. The acid has a water solubility selected from a range of about 0-20 g/100 mL of water, a pKa selected from a range about 1 to about 4, and a $K_{ow}$ selected from a range of about −0.4 to about 1, and is adapted for modifying a cure rate of an infiltrant to facilitate penetration of the infiltrant into the article. The particulate mixture is substantially free of plaster retarders. The aqueous fluid is substantially clear, has a viscosity selected from a range of 1-1.35 cps, a surface tension selected from a range of 30-36 dynes/cm, and a pH selected from a range 4.9 to 10.3.

In another aspect, embodiments of the invention include a method for forming an article by three-dimensional printing. The method includes providing a loose, dry, and substantially free-flowing particulate mixture including a plurality of adjacent particles, the particulate mixture comprising a water-soluble adhesive, plaster, a plaster accelerator, a whitening agent and a solid particulate additive comprising an acid. An aqueous fluid is applied to at least some of the plurality of particles in an amount sufficient to bond those particles together to define at least a portion of the article. The aqueous fluid includes water, a humectant, a surfactant, a preservative, and an optical brightening agent. The defined portion of the article solidifies without mechanical agitation and without supplemental electromagnetic radiation.

One or more of the following features may be included. The article formed by the method may develop a strength of at least 1 MPa within about one hour of being formed. The article may be infiltrated with a cyanoacrylate adhesive, and may develop the final ultimate infiltrated strength within one hour of infiltration.

In another aspect, embodiments of the invention include an essentially solid article manufactured by a three-dimensional printing process. The essentially solid article includes a product of the reaction of a mixture including (i) a particulate material including a water-soluble adhesive, a partially soluble filler, an accelerator, an additive having a pKa selected from a range of about 1 to about 4, and a $K_{ow}$ selected from a range of about −0.4 to about 1 and a whitening agent, and (ii) an aqueous fluid including water, a humectant, a rheology modifier, a surfactant, a preservative, and an optical brightening agent. The particulate material is reacted with at least a portion of the aqueous fluid to form the essentially solid article including a plurality of essentially evenly distributed layers of the reaction product.

The article may include a cyanoacrylate-based adhesive infiltrant and have a final ultimate strength greater than 15 MPa.

In an aspect, embodiments of the invention include a powder adapted for three-dimensional printing. The powder includes a substantially dry, free-flowing particulate mixture including a water-soluble adhesive, a partially soluble filler, an accelerator, and a whitening agent having an L* of at least about 90 and a C* of up to about 5.5. The particulate material is suitable for use in three-dimensional printing to form an article formed of a plurality of layers, the layers including a reaction product of the particulate material and an aqueous fluid that contacts the particulate material during three-dimensional printing.

One or more of the following features may be included. The substantially dry particulate mixture may have a Bredt parameter of at least about 0.10. An internal angle of friction of the particulate mixture may have a value selected from a range of 40° to 70°. The particulate mixture may include about 0.01% to about 5% by weight of the whitening agent. A refractive index of the whitening agent may be at least about 1.9. The whitening agent may have a solubility in an aqueous solution of 5 wt % glycerol of at least about 5 mg/liter. The whitening agent may include a salt, e.g., potassium sulfate and/or potassium aluminum sulfate. The whitening agent may include a second water-soluble adhesive. The whitening agent may be a high whiteness starch or a high whiteness starch derivative. The whitening agent may be insoluble in an aqueous solution of 5 wt % glycerol. The whitening agent may include, e.g., zinc oxide, titanium dioxide ($TiO_2$), hollow glass spheres, limestone, a clay, and/or combinations thereof The water-soluble adhesive may include polyvinyl alcohol. The partially soluble filler may include plaster. The accelerator comprises a plaster accelerator.

In another aspect, embodiments of the invention include a powder adapted for three-dimensional printing. The powder includes a substantially dry, free-flowing particulate mixture including a water-soluble adhesive, a partially soluble filler, an accelerator, and a solid particulate additive comprising an acid. The particulate material is suitable for use in three-dimensional printing to form an article comprised of a plurality of layers, the layers including a reaction product of the particulate material and an aqueous fluid that contacts the particulate material during three-dimensional printing. Also, the additive has a water solubility from about 0-20 g/100 mL of water, a pKa of between about 1 and about 4, and a $K_{ow}$ selected from a range of about −0.4 to about 1, and is suitable for modifying a cure rate of an infiltrant to facilitate penetration of the infiltrant into the article.

One or more of the following features may be included. The pKa of the additive may be about 3 and its $K_{ow}$ is selected from a range of about −0.5 to about 0.5. The particulate mixture may include about 0.01% to about 5% by weight of the additive. The additive may be, e.g., fumaric acid, tartaric acid, fatty acids, gluconic acids, adipic acid, glucono-delta-lactone (GdL), ethylenediaminetetraacetic acid, succinic acid, a phenolic compound, and/or combinations thereof. The water-soluble adhesive may include polyvinyl alcohol and the partially soluble filler may include a plaster. The accelerator may include a plaster accelerator. The plaster may be, for example, plaster of paris, sulphate of lime, hydrated calcium sulphate, dental plaster, $CaSO_4·½H_2O$, $CaSO_4·2H_2O$, and/or combinations thereof. The plaster accelerator may be, e.g., hydrated gypsum, potassium sulfate, potassium aluminum sulfate, and/or combinations thereof. The additive may not be a catalyst affecting a rate of a reaction between the plaster and water. The powder may also include a whitening agent.

In yet another aspect, embodiments of the invention may include an aqueous fluid for activating water soluble components of a three-dimensional printing powder. The aqueous fluid may include water, a humectant, a preservative, and an optical brightening agent.

One or more of the following features may be included. The aqueous fluid may be substantially clear. The optical brightening agent may include a fluorescent brightener based on stilbene chemistry. The optical brightening agent may be distyrylbiphenyl. The aqueous fluid may include from about 0.05-about 5 wt % of the optical brightening agent.

In still another aspect, embodiments of the invention include a kit. The kit includes a powder adapted for three-dimensional printing. The powder includes a substantially dry, free-flowing particulate mixture that includes a water-soluble adhesive, a partially soluble filler, an accelerator, and a whitening agent having an L* of at least 90 and a C* of up to 5.5. The kit also includes an aqueous fluid for activating water soluble components of a three-dimensional printing powder. The aqueous fluid includes water, a humectant, a preservative, and an optical brightening agent. The particulate material is suitable for use in three-dimensional printing to form an article comprising a plurality of layers, the layers including a reaction product of the particulate material and the aqueous fluid that contacts the particulate material during three-dimensional printing.

One or more of the following features may be included. The kit may include a combination of binders comprising cyan, magenta, and yellow binders. The particulate material may also include a solid particulate additive including an acid.

In another aspect, embodiments of the invention includes a kit. The kit includes a powder adapted for three-dimensional printing. The powder includes a substantially dry, free-flowing particulate mixture including a water-soluble adhesive, a partially soluble filler, an accelerator, and a solid particulate additive comprising an acid. The kit also includes an aqueous fluid for activating water soluble components of a three-dimensional printing powder. The aqueous fluid includes water, a humectant, a preservative, and an optical brightening agent. The particulate material is suitable for use in three-dimensional printing to form an article comprised of a plurality of layers, the layers including a reaction product of the particulate material and an aqueous fluid that contacts the particulate material during three-dimensional printing. The additive has a pKa of between about 1 and about 4, and a $K_{ow}$ selected from a range of about −0.4 to about 1, and is suitable for modifying a cure rate of an infiltrant to facilitate penetration of the infiltrant into the article.

The kit may include a combination of binders, including cyan, magenta, and yellow binders.

In another aspect, embodiments of the invention include a method for forming an article by three-dimensional printing. The method includes providing a substantially dry, free-flowing particulate material comprising a plurality of adjacent particles, the particulate material comprising a water soluble adhesive, a partially soluble filler, an accelerator, and a whitening agent. A fluid binder is applied to at least some of the plurality of particles in an amount sufficient to bond those particles together to define at least a portion of the article. The fluid binder includes water, a humectant, a rheology modifier, a surfactant, a preservative, and an optical brightening agent.

One or more of the following features may be included. The bonding of the article may be substantially free of mechanical agitation. The article formed by the method develops a strength of at least 1 MPa within about one hour of being formed.

In still another aspect, embodiments of the invention include a method for forming an article by three-dimensional printing. The method includes providing a substantially dry, free-flowing particulate material comprising a plurality of adjacent particles, the particulate material including a water soluble adhesive, a partially soluble filler, an accelerator, and an additive for controlling a curing rate of an infiltrant. A fluid binder is applied to at least some of the plurality of particles in an amount sufficient to bond those particles together to define at least a portion of the article. The fluid binder includes water, a humectant, a rheology modifier, a surfactant, a preservative, and an optical brightening agent.

The particulate material may also include a whitening agent.

In still another aspect, embodiments of the invention include an essentially solid article manufactured by a three-dimensional printing process. The essentially solid article includes a product of the reaction of a mixture including (i) a particulate material including a water-soluble adhesive, a partially soluble filler, an accelerator, and a whitening agent, and (ii) an aqueous fluid including water, a humectant, a preservative, and an optical brightening agent. The particulate material is reacted with at least a portion of the aqueous fluid to form the essentially solid article including a plurality of essentially evenly distributed layers of the reaction product.

The whitening agent may be insoluble in an aqueous solution of 5 wt % glycerol, and may be present in the article as a passive filler.

In another aspect, embodiments of the invention include an essentially solid article manufactured by a three-dimensional printing process. The essentially solid article is a product of the reaction of a mixture including (i) a particulate material including a water-soluble adhesive, a partially soluble filler, an accelerator, and an additive having a pKa selected from a range of about 1 to about 4, and a $K_{ow}$ selected from a range of about −0.4 to about 1, and (ii) an aqueous fluid including water, a humectant, a preservative, and an optical brightening agent. The particulate material is reacted with at least a portion of the aqueous fluid to form the essentially solid article including a plurality of essentially evenly distributed layers of the reaction product. In still another aspect, embodiments of the invention include an essentially solid article manufactured by a three-dimensional printing process. The essentially solid article includes a product of a reaction of a mixture of (i) a particulate material including an additive to control a rate of cure of a cyanoacrylate adhesive, and (ii) an aqueous fluid including water, a humectant, a preservative, and an optical brightening agent. The particulate material is reacted with at least a portion of the aqueous fluid to form the essentially solid article including a plurality of essentially evenly distributed layers of the reaction product.

BRIEF DESCRIPTION OF THE FIGURES

The following drawings are not necessarily to scale, emphasis instead being placed generally upon illustrating the principles of the invention. The foregoing and other features and advantages of the present invention, as well as the invention itself, will be more fully understood from the following description of exemplary and preferred embodiments, when read together with the accompanying drawings, in which:

FIGS. 16 and 17 are graphs illustrating the forces acting on a particle during three-dimensional printing;

DETAILED DESCRIPTION

Three-Dimensional Printing

Figure 1:
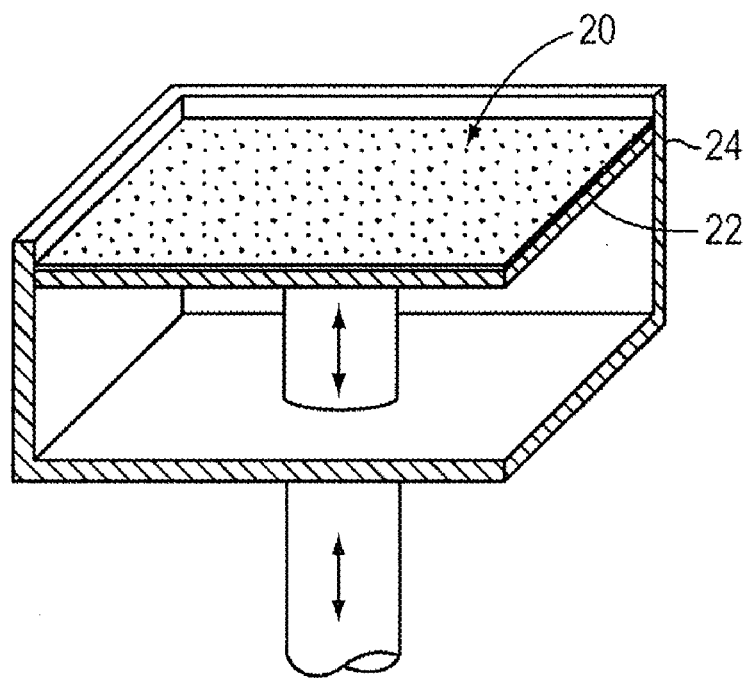
FIG. 1 is a schematic view of a first layer of a mixture of particulate material of an embodiment of the invention deposited onto a downwardly movable surface of a container on which an article is to be built, before any fluid has been delivered.

Referring to FIG. 1, in accordance with a printing method using the materials system of the present invention, a layer or film of a particulate material 20, i.e., a powder, is applied to a linearly movable surface 22 of a container 24. The layer or film of particulate material 20 may be formed in any suitable manner, for example using a counter-roller. The particulate material 20 applied to the surface may include a water-soluble adhesive, an accelerator, and a whitening agent having an L* of at least 90, and a C* of up to 5.5. Alternatively, the particulate material 20 may include a water-soluble adhesive, an accelerator, and a solid particulate additive comprising an acid. The particulate material 20 may also include an additional adhesive, a filler material, a processing aid material, an absorbent filler, and/or a fibrous material.

Figure 2:
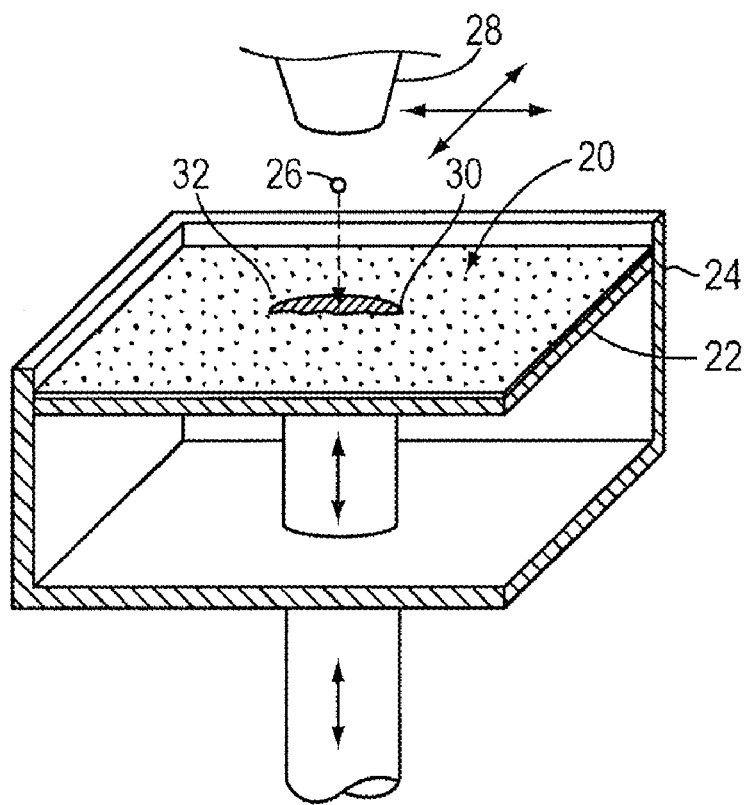
FIG. 2 is a schematic view of an ink-jet nozzle delivering a fluid to a portion of the layer of particulate material of FIG. 1 in a predetermined pattern.

Referring to FIG. 2, an ink-jet style nozzle 28 delivers an activating fluid 26 to at least a portion 30 of the layer or film of the particulate mixture 20 in a two-dimensional pattern. According to the printing method, the fluid 26 is delivered to the layer or film of particulate material 20 in any predetermined two-dimensional pattern (circular, in the figures, for purposes of illustration only), using any convenient mechanism, such as a drop-on-demand (DOD) print head driven by software in accordance with article model data from a computer-assisted-design (CAD) system.

The first portion 30 of the particulate mixture is activated by the fluid 26, causing the activated particles to adhere together to form a conglomerate of the particulate material 20 (powder) and fluid 26. The conglomerate defines an essentially solid circular layer that becomes a cross-sectional portion of an intermediate article 38 (see, e.g., FIGS. 3 and 4). As used herein, "activates" is meant to define a change in state from essentially inert to adhesive. This definition encompasses the activation of the adhesive particulate material to bond the filler particulate material. When the fluid initially comes into contact with the particulate mixture, it immediately flows outwardly (on a microscopic scale) from the point of impact by capillary suction, dissolving the adhesive within a relatively short time period, such as the first few seconds. A typical droplet of activating fluid has a volume of about 40 picoliters (pl), and spreads to a diameter of about 100 μm after coming into contact with the particulate mixture. As the solvent dissolves the adhesive, the fluid viscosity increases dramatically, arresting further migration of the fluid from the initial point of impact. Within a few minutes, the fluid with adhesive dissolved therein infiltrates the less soluble and slightly porous particles, forming adhesive bonds between the filler particulate material as well as between the additional fillers, absorbent fillers, and/or fibers which may be present. The activating fluid is capable of bonding together an amount of the particulate mixture that is several times the mass of a droplet of the fluid. As volatile components of the fluid evaporate, the adhesive bonds harden, joining the adjacent particulates into a rigid structure, which becomes a cross-sectional portion of the final article 40.

Any unactivated particulate mixture 32 that was not exposed to the fluid remains loose, dry and free-flowing on the movable surface 22. The unactivated particulate mixture is typically left in place until formation of the intermediate article 38 is complete. Leaving the unactivated, loose and dry particulate mixture in place ensures that the intermediate article 38 is fully supported during processing, allowing features such as overhangs, undercuts, and cavities to be defined and formed without the need to use supplemental support structures. After formation of the first cross-sectional portion of the intermediate article 38, the movable surface 22 is indexed downwardly, in this embodiment, and the process is repeated.

Using, for example, a counter-rolling mechanism, a second film or layer of the particulate mixture is then applied over the first layer, covering both the rigid first cross-sectional portion, and any proximate loose particulate mixture. A second application of fluid follows in the manner described above, dissolving the adhesive and forming adhesive bonds between at least a portion of the previous cross-sectional formed portion, the filler particulate material, and, optionally, additional filler, absorbent fillers, and fibers of the second layer, and hardening to form a second rigid cross-sectional portion added to the first rigid cross-sectional portion of the final article. The movable surface 22 is again indexed downward.

Figure 3:
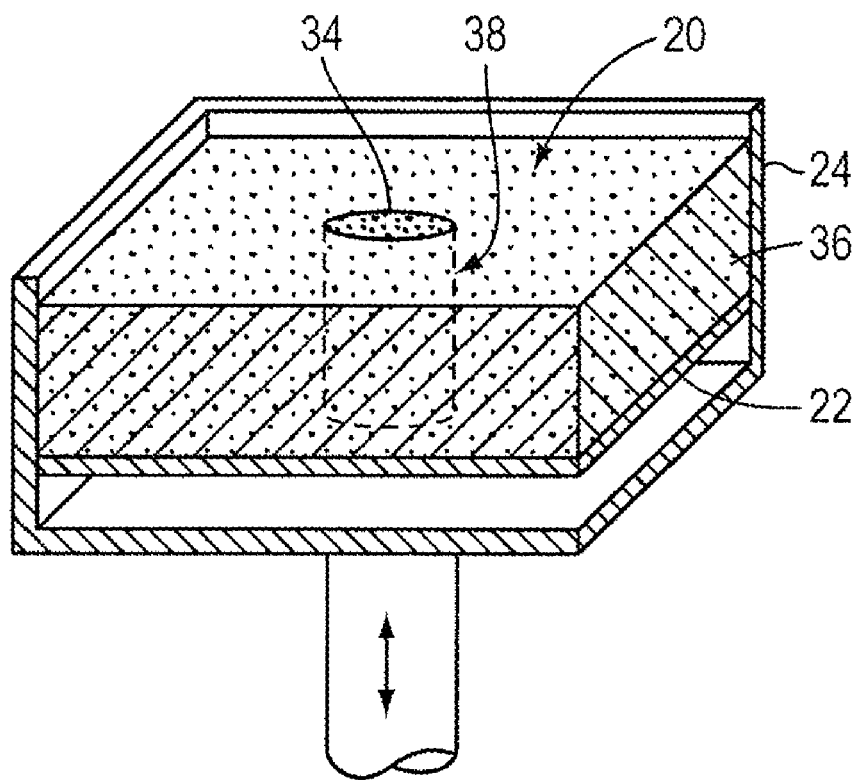
FIG. 3 is a schematic view of a final article of an embodiment of the invention enclosed in the container, the article made by a series of steps illustrated in FIG. 2 and still immersed in the loose unactivated particles.

The previous steps of applying a layer of particulate mixture, including the adhesive, applying the activating fluid, and indexing the movable surface 22 downward are repeated until the intermediate article 38 is completed. Referring to FIG. 3, the intermediate article 38 may be any shape, such as cylindrical. At the end of the process, only a top surface 34 of the intermediate article 38 is visible in the container 24. The intermediate article 38 is typically completely immersed in a surrounding bed 36 of unactivated particulate material. Alternatively, an article could be formed in layers upward from an immovable platform, by successively depositing, smoothing, and printing a series of such layers.

Figure 4:
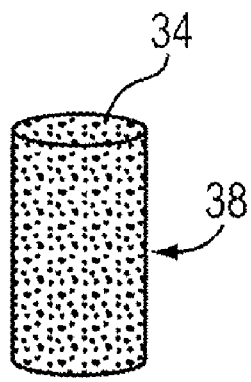
FIG. 4 is a schematic view of the final article of FIG. 3.

Referring to FIG. 4, the unactivated particulate material may be removed from the intermediate article 38 by pressurized air flow or a vacuum. After removal of the unactivated particulate material from the intermediate article 38, a post-processing treatment may be performed, such as cleaning, drying, infiltration with stabilizing materials, painting, etc. to define a final article 40, having the same shape as intermediate article 38, but with additional desired characteristics, such as a stiffness, strength, and flexibility. The final article 40 may be essentially solid, including a plurality of essentially evenly distributed layers of a reaction product between a particulate mixture and an aqueous fluid. Suitable particulate mixtures and aqueous fluids are described in detail below.

Additionally, the article may be infiltrated with a cyanoacrylate-based adhesive, and the article may develop its final ultimate infiltrated strength within one hour of infiltration. Articles infiltrated with a cyanoacrylate-based adhesive infiltrant that develop a final ultimate strength greater than 15 MPa may have a wider range of utility than articles with lower strength, or those that take longer to develop their ultimate strength.

Particulate Material

In a preferred embodiment, a particulate material, i.e., a substantially dry particulate material, includes:

| | |
|---|---|
| water soluble adhesive | 3-20 wt %; |
| plaster | 50-95 wt % |
| whitening agent | 0.01-5 wt % |
| plaster accelerator(s) | 0-5 wt % |
| solid particulate additive including an acid | 0.01-5 wt % |

Other dry particulate material components may include, for example:

| | |
|---|---|
| processing aids | 0.01-2.0 wt % |

The particulate materials and fluids described herein are adapted for producing a solid three-dimensional article by three-dimensional printing. Preferably, the formulation sets relatively quickly, such that the printed article can be handled in, e.g., minutes after the completion of the article-making process. Accordingly, although a balance of accelerators and retarders is often used in the plaster industry to create a delayed setting time, e.g., for spackling compounds, the use of retarders is preferably avoided for 3D printing. In some embodiments, the particulate mixture is substantially free of plaster retarders.

A preferred particle size of the components of the particulate material, i.e., average particle diameter, ranges from 10 micrometers (μm) to 125 μm.

The plaster (e.g., plaster of paris, sulphate of lime, hydrated calcium sulphate, dental plaster, $CaSO_4 \cdot \frac{1}{2}H_2O$, $CaSO_4 \cdot 2H_2O$, and combinations thereof) typically forms the largest portion of the article structure, providing dimensional stability and adhesion for strength of an article formed from the particulate material. Suitable plaster particulates for use with embodiments of the invention have a particle size distribution ranging from greater than 20 μm to less than 125 μm. Preferably, the plaster is white and clean, such as, for example, the Hydrocal products produced by US Gypsum.

Plaster is frequently called "plaster of paris," a name derived from the earths of Paris and its surrounding regions, which contain an abundance of the mineral gypsum, from which plaster of paris is manufactured. Plaster is also referred to by many other names, including, but not limited to, sulphate of lime, semihydrate of calcium sulfate, casting plaster, gypsum plaster, hydrated sulphate of lime, hydrated calcium sulphate, and dental plaster, as well as a variety of trade names. The term "plaster," as used herein, is meant to define any variety of material including a substantial amount of $CaSO_4 \cdot \frac{1}{2}H_2O$ that is in powder form prior to the application of an aqueous fluid. The terms "hydrated plaster" and "set plaster" are used interchangeably herein, and are meant to include any variety of plaster that includes a substantial amount of $CaSO_4 \cdot 2H_2O$ after setting, or rehydration. Many varieties of plaster are commercially available, varying, for example, in structural strength, the time required for setting, and in volume changes that occur during the setting. Typically, commercially available plasters include other ingredients such as, but not limited to, silica, powder limestone, starch, Terra Alba, and lime. Examples of commercially available plaster materials that may be suitable for the present invention include, but are not limited to, white hydrocal cement, durabond 90, and drystone (each available from U.S. Gypsum, located in Chicago, Ill.), as well as most brands of casting plaster, molding plaster, and spackling compound.

When calcined at about 350° F., gypsum loses a substantial amount of its water of crystallization, and is thereby transformed into plaster. The dehydration, or "calcination" of gypsum, proceeds according to reaction (1) below:

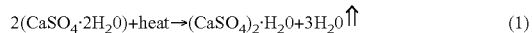
$$2(CaSO_4 \cdot 2H_2O) + heat \rightarrow (CaSO_4)_2 \cdot H_2O + 3H_2O \uparrow \quad (1)$$

Conventional plaster processing generally involves vigorously and thoroughly mixing plaster and water to form a slurry that is saturated with water and poured into a mold to "set up," which typically takes about 30 minutes. After the plaster is mixed with the water, small quantities of the plaster crystallize and interlock together, cementing together the remaining insoluble particles. The interlocking of crystals is responsible for a great deal of the eventual physical strength of the set plaster. Conventionally, during the period in which the plaster sets up, any physical disturbance to the setting plaster should be minimized, or the plaster may not achieve its potential maximum strength, because the minute crystals of gypsum will not completely interlock. When mixed with sufficient water, plaster recovers the 1½ parts of water it possessed prior to calcination of the gypsum, and sets to a solid material of substantially the same composition as gypsum. When properly calcined, plaster is fairly insoluble in cold water and only slightly soluble in warm water. For example, at room temperature, about one part of plaster is soluble in about 400 parts of water. The rehydration, or re-crystallization of plaster, after it has been mixed with water, is referred to as "setting," and proceeds according to the following equation (2):

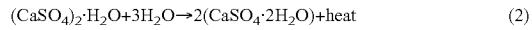
$$(CaSO_4)_2 \cdot H_2O + 3H_2O \rightarrow 2(CaSO_4 \cdot 2H_2O) + heat \quad (2)$$

In embodiments that include a plaster-containing particulate material, the plaster chemistry is preferably considered when selecting any additive, both for the powder and the liquid binder. Many starches and water soluble polymers hold onto water tightly, thereby slowing the rate at which plaster articles dry and reducing the handling strength of the articles at early timepoints. Strongly ionic materials, i.e., chelating agents, for example some phosphates such as sodium tripolyphosphate, may interfere with the plaster hydration reaction by chelating the calcium ions or competing for the sulfate ion, which may reduce the driving force toward calcium sulfate dihydrate, thereby retarding the set of the printed layers and allowing distortion to happen during printing during the swelling and contraction of the water soluble adhesives.

To determine the strength performance of a particular particulate material, it is generally preferable to print a standard test specimen on a 3D printer, for example a zprinter310 plus, made by Z Corporation of Burlington, Mass. A useful specimen for evaluating the strength of an article formed by this method is a small bar, with dimensions of roughly 5 millimeter (mm)×5.5 mm×50 mm. Such bars may be printed, allowed to sit for approximately one hour in the machine after printing, and then broken on a 3-point bend testing machine. The same bars may be dried in an oven at 100° F. for up to 24 hours to determine the final strength that may be expected from a 3D printed article, prior to infiltration.

Additionally, the surface of an article may be examined for any excess caking of powder, the measure of which has been called depowderability. Depowderability may be measured by printing an article with a series of cylindrical holes of decreasing internal diameter. A depowderability score of 1 means that a hole with a diameter of approximately 6 mm can be cleared by blowing on the article with a compressed air supply, and a score of 10 would correlate to a hole of approximately 2 mm in diameter that can be successfully cleared with compressed air under the same conditions. An article made with a mixture resulting in a low depowderability score, i.e., is difficult to depowder, typically tends to have superfluous material adhering to its outside surface. This superfluous material may cause inaccurate geometry, i.e., articles may be formed larger than specified. Articles that score very highly for depowderability, e.g., >10, may still exhibit a a haze of white particles that is detrimental to the color accuracy of a prototype article. Haze may be assessed by eye, or measured with a device such as the Greytag MacBeth iOne handheld color spectrophotometer. Articles where the intended color appears "washed out" due to haze are generally not desireable.

The water soluble adhesive dissolves quickly, and migrates locally while in solution, provides extra toughness in the system, and helps to control bleed or pooling of fluid binder in selectively printed areas. A suitable water soluble adhesive is polyvinyl alcohol. More generally, suitable water-soluble adhesives may include water-soluble polymers, carbohydrates, sugars, sugar alcohols, organic acids, proteins, and/or inorganic compounds. Examples of water-soluble polymers include polyvinyl alcohol, sulfonated polystyrene, sulfonated polyester, polyethylene oxide, polyacrylic acid, octylacrylamide/acrylate/butylaminoethyl methacrylate copolymer, acrylates/octylarylamide copolymer, polyvinyl pyrrolidone, styrenated polyacrylic acid, polyethylene oxide, sodium polyacrylate, sodium polyacrylate copolymer with maleic acid, polyvinyl pyrrolidone copolymer with vinyl acetate, butylated polyvinylpyrrolidone, polyvinyl alcohol-co-vinyl acetate, starch, modified starch, cationic starch, pregelatinized starch, pregelatinized modified starch, pregelatinized cationic starch, and combinations and copolymers thereof.

The inclusion of a whitening agent may help raise the brightness (measured as $L^*$) of a printed article above that achievable with, e.g., plaster alone, imparting a more neutral white point. Neutral whites improve the contrast and quality of colors printed throughout the article, providing a greater color gamut. Preferably, the refractive index of the whitening agent is at least 1.9. Titanium dioxide is a suitable pigment with a refractive index of 2.4. Zinc oxide is an alternative pigment with a refractive index of 2.0. Other suitable whitening agents include a second water soluble adhesive, modified starches, clays, zinc sulfide, barium sulfate, zirconium silicate, lead carbonate, limestone, and hollow glass spheres, such as borosilicate glass spheres.

Figure 5:
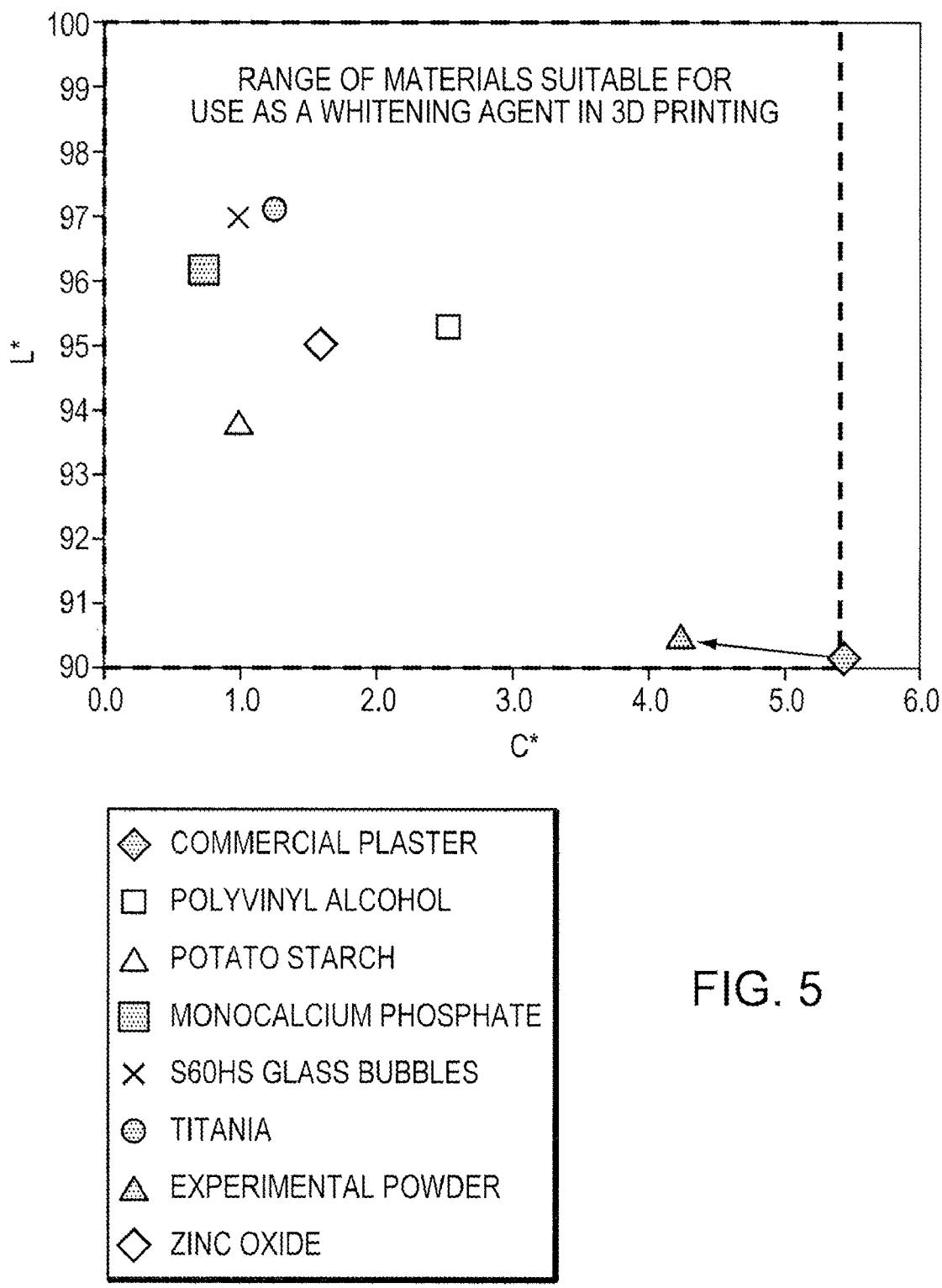
FIG. 5 is a graph illustrating brightness L* and chroma C* of several powders pressed into dry pellets.

The whitening agent serves to make a printed article more "white." This characteristic is measured as an increase of brightness $L^*$ towards 100 (typical values are 80-90), and a decrease in chroma $C^*$ (typical values 1-10) towards zero for the white point. A perfect white has the properties of $L^*=100$, $C^*=0$. An exemplary graph of $L^*$ and $C^*$ for various materials suitable for use as a whitening agent in 3D printing is provided in FIG. 5. Further discussion of $L^*$ and $C^*$ may be found in the optical brightener section herein, or in the literature. Using too much of some whitening agents may cause deep, saturated colors to look washed out in the final article. The whitening agent is preferably selected so as to not compromise the chemistry of the article building process. Representative L* and C* data of some whitening agents with an experimental plaster powder for three-dimensional printing are shown in FIG. 5. Here, several powders were individually pressed into dry pellets and then the top surface of the pellet was measured using a Greytag MacBeth eye-One spectrophotometer for brightness L* and chroma C*. The white point of an experimental powder initially measured is L*=90 and C*=5.5. With the addition of about 0.1 wt % titania, the white point of the experimental powder shifted to L*=90.5 and C*~4. The arrow on the chart loosely represents the expected path that the white point of the material would follow as $TiO_2$ is added to this system. This correction of the white point of the powder to a lighter, less chromatic white enables the creation of 3D printed articles with brighter and more accurate color.

The whitening agent may be soluble in an aqueous solution of 5 wt % glycerol, with a solubility of at least 5 mg/liter. The whitening agent may be a water-soluble adhesive, such as a StarDri product manufactured by Tate & Lyle. In some embodiments, the whitening agent is a salt, such as very pure potassium sulfate or potassium aluminum sulfate. In other embodiments, the whitening agent is a high whiteness starch, such as processed potato starch or derivatives thereof.

The inclusion of the acidic solid particulate additive (i.e., an acidifying agent) may inhibit the cure rate of the most commonly used infiltrant, cyanoacrylates. Cyanoacrylates cure via anionic polymerization in the presence of a weak base, such as water. When one attempts to pour a cyanoacrylate resin onto an article that has not yet fully dried, water in the article may cause the cyanoacrylate to react on the surface of the article, thereby sealing the pores and preventing further infiltrant from penetrating into the article. Cyanoacrylates may be stabilized in their packaging by the addition of weak acids. Acids either consume that –OH ion or prevent water from dissociating into H+ and –OH ions. The inclusion of certain weak acids in the particulate mixture may retard the cure of a cyanoacrylate during the infiltration of an article formed by three-dimensional printing, allowing deeper penetration into the article, leading to the creation of stronger prototypes with dry and slightly damp articles.

Figure 6:
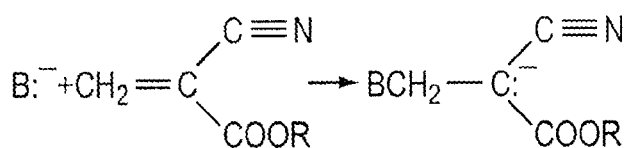
FIG. 6 is a diagram illustrating three stages of the anionic polymerization of a cyanoacrylate.
Figure 6:
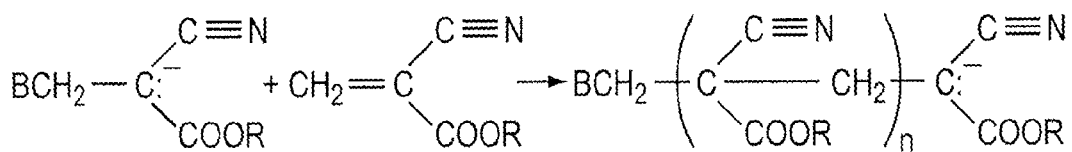
Figure 6:
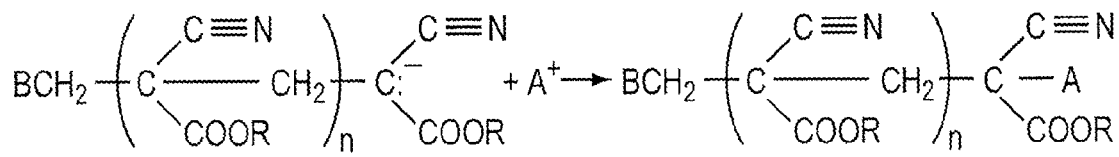

Referring to FIG. 6, the anionic polymerization of a cyanoacrylate has three stages. The base B reacts with the C=C bond, leaving a reactive group on the central carbon. The reaction continues until a reactive component reacts with an acid molecule A.

Several factors may be considered when choosing an acid to use as an inhibitor for an infiltrant such as cyanoacrylate. The primary concern is safety, because ingredients that are powerful acids are likely to be irritating at the least, or corrosive and deadly at worst. Secondly, some acids exist as hygroscopic solids. When left in humid environments, such as the region of unprinted powder adjacent a selectively activated article, these materials may become cakey and adhesive, forming undesired films on the sides of the article. Such films may lead to dimensional inaccuracy and/or a white haze over the colored regions of a printed article, significantly detracting from its utility, appearance, and value. Water solubility is a good indicator of how likely an acid is to form a visible film on the side of a part. A solubility range of 0-10 grams/100 mL of water is preferred.

The acid ionization constant of an acid, represented by pKa, is a measure of the propensity of a compound to donate a proton. Strong acids, i.e., those with a pKa<–2, dissociate fully. Acids with kPa>–2 are less likely to dissociate, and therefore are less likely to be in solution to participate in a plaster reaction. pKa values of various materials are readily available in the literature. Acids that work well as inhibitors for plaster-based systems infiltrated with a cyanocrylate resin typically have a pKa selected from a range of 1-4.

An octanol-water coefficient $K_{ow}$ of the acidic additive may fall within a range of –0.4 to 1. The octanol-water partition coefficient is the ratio of the concentration of a chemical in octanol and in water at equilibrium and at a specified temperature. Water solubility has been correlated to the $K_{ow}$ of a material.

The pKA and log $K_{ow}$ of various acids are indicated in Table 1.

TABLE 1 pKa and log $K_{ow}$ data for various acids

| Acid Name | pKa | log $K_{ow}$ | sol (g/100 mL) |
| --- | --- | --- | --- |
| GdL | 3.84 | –1.98 | 59 |
| EDTA | 1.7 | –3.86 | 0.05 |
| Tartaric | 3.2 | –1 | 133 |
| Fumaric | 3.03 | 0.05 | 0.49 |
| Citric | 3.13 | –1.67 | 175 |
| HCl | –7 | 0.25 | Miscible |
| HF | 3.45 | | Miscible |
| Sulfuric | –2 | | Miscible |
| Maleic | 1.87 | 0.05 | 78 |
| Succinic | 4.19 | –0.75 | 7.8 |
| Polyacrylic | 5 | 0.35 | Miscible |
| Orthophosphoric | 2.16 | | Miscible |
| formic acid | 3.75 | –0.54 | Miscible |
| Acetamide | 15.1 | –1.16 | 200 |
| Methanol | 15.5 | –0.82 | Miscible |
| Bis(2-ethylhexyl) phosphate | <3 | 2.67 | 0.21 |
| dibutyl phenyl phosphate | 0.1 | 4.27 | 96 |
| tris (2-ethylhexyl) phosphate | <3 | >8 | 0 |
| 2,2-bis(chloromethyl) trimethylene bis[bis(2-chloroethyl) phosphate] | 0-10 | 2.83 | 232 |

Figure 7:
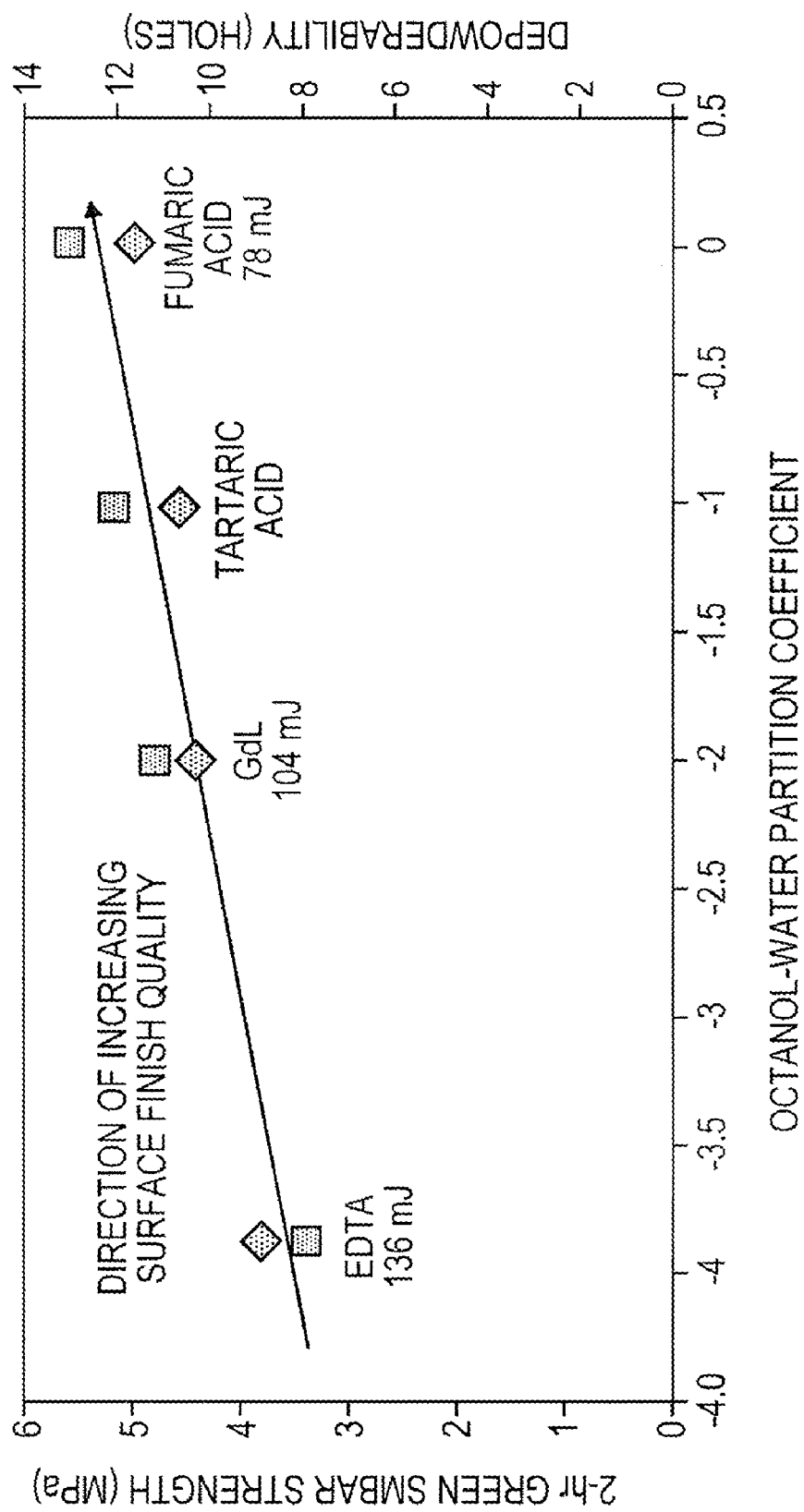
FIG. 7 is a graph illustrating the correlation of surface finish defects caused by powder caking in crevices with acid solubility.
Figure 8:
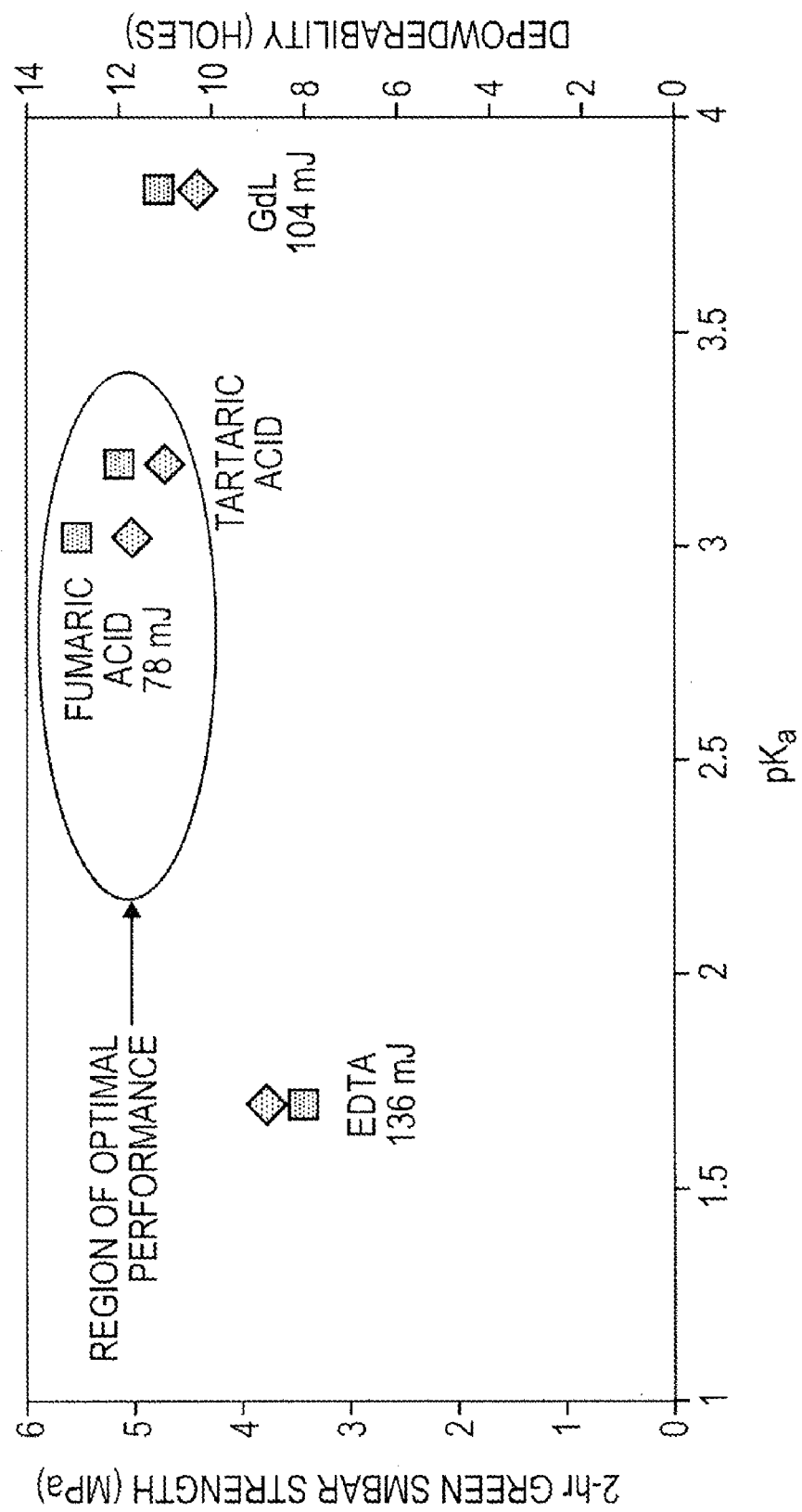
FIG. 8 is a graph illustrating the relationship between pKa and an optimum amount of an acid that needs to be used to produce an article with a preferred combination of green part curing, appearance, accuracy, final infiltrated strength, and cure time.

FIGS. 7 and 8 show the correlation of $K_{ow}$ and pKa, respectively, with early strength and surface cake for several representative acids. Referring to FIG. 7, the right axis of the graph indicates a measure of depowderability, with higher values of depowderability correlating to cylindrical holes with increasingly smaller diameters These smaller holes are not clogged with partially set powder that can be caused by the evaporation of liquid in the printed article during the curing process. As the depowderability score increases, surface finish defects caused by powder caked into crevices decreases. The left axis of the graph reflects a measurement of the strength of an article taken via a 3 point bend test, i.e., a two hour green smbar strength (mPa). As the strength of an article, made from a particular powder, measured two hours after the completion of the build increases, the utility of that powder for making rapid prototyping parts increases. Both strength and depowderability increase for acids with a higher octanol-water partition coefficient ($K_{ow}$) (horizontal axis). This correlation is consistent with the premise that the plaster reaction proceeds more quickly with less soluble acids, and that less soluble ingredients are less likely to cause surface caking that may detract form the accuracy or appearance of an article. Preferably, the solid particulate additive is not a catalyst affecting a rate of a reaction between the plaster and the aqueous fluid.

Referring to FIG. 8, the left axis indicates the strength of an article measured 2 hours after the completion of the build, and the right axis indicates depowderability. Both of these values are correlated to the pKa of several acids. Acids where the pKa range from 1.5 to 4 may be used to print parts with a plaster based system. The system in question exhibited optimum, i.e., relatively highest, strength and depowderability with acids whose pKa is approximately 3.

Figure 9:
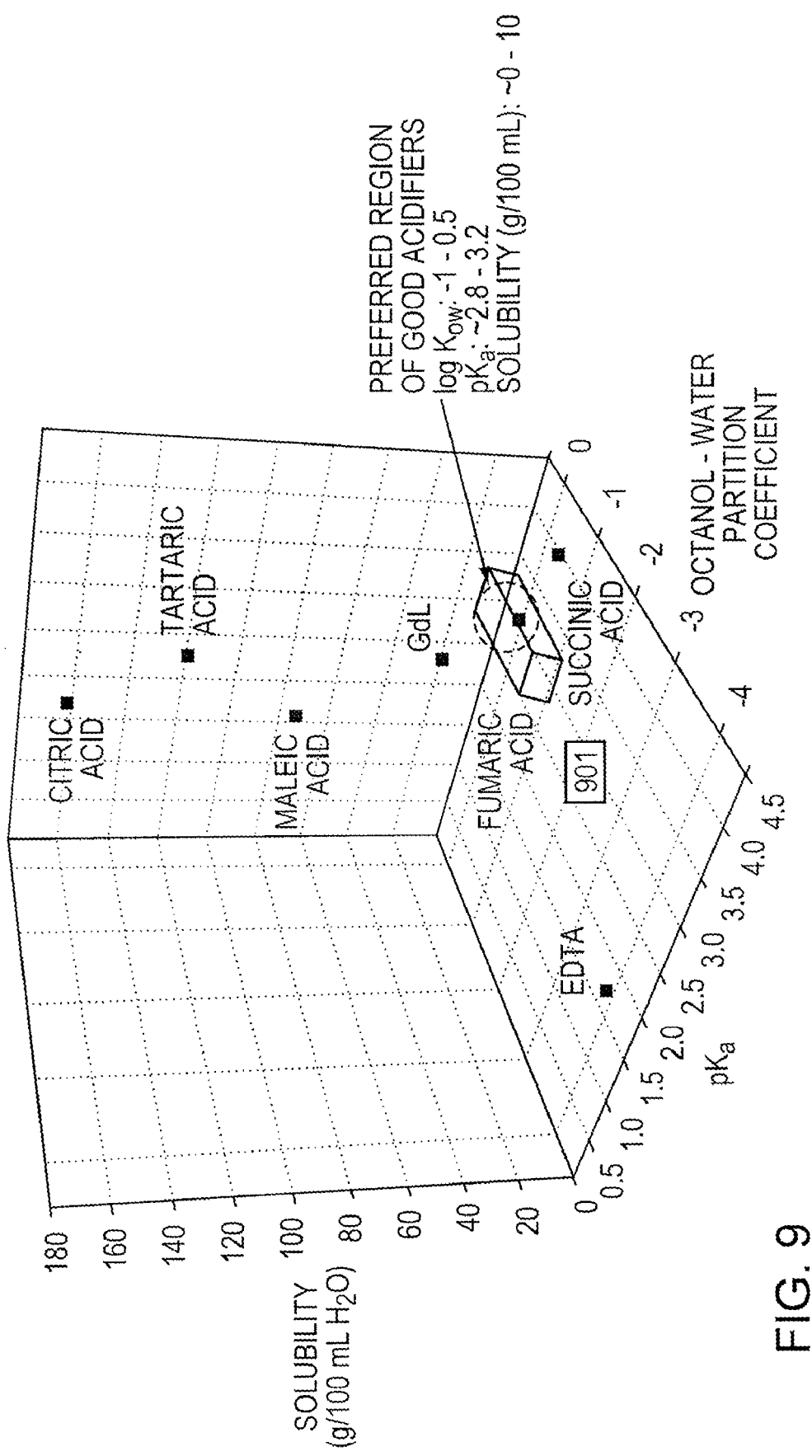
FIG. 9 is a three-dimensional plot of parameters used to select acid components for use as inhibitors of cyanoacrylate in a plaster based three-dimensional printing media.

The pKa changes the preferred amount of an acid that needs to be used to produce an article with a preferred combination of green part curing, appearance, accuracy, final infiltrated strength, and cure time. Referring to FIG. 9, a three-dimensional plot is used to illustrate the relationship between the combined parameters of water solubility, octanol-water partition coefficient $K_{ow}$, and acid ionization constant pKa. The preferred region 901 of acidifiers for use in a plaster based powder system for 3D printing may be represented by a bounding box drawn from the union of the ranges log $K_{ow}$ (−1 to 0.5), pKa (−2.8-3.2), solubility (0-10 g/100 mL). These parameters may be used to select acid components for use as inhibitors of cyanoacrylate in a plaster-based three-dimensional printing system. Optimization around any single parameter may lead to defects in strength, cure rate, and article appearance.

Figure 10:
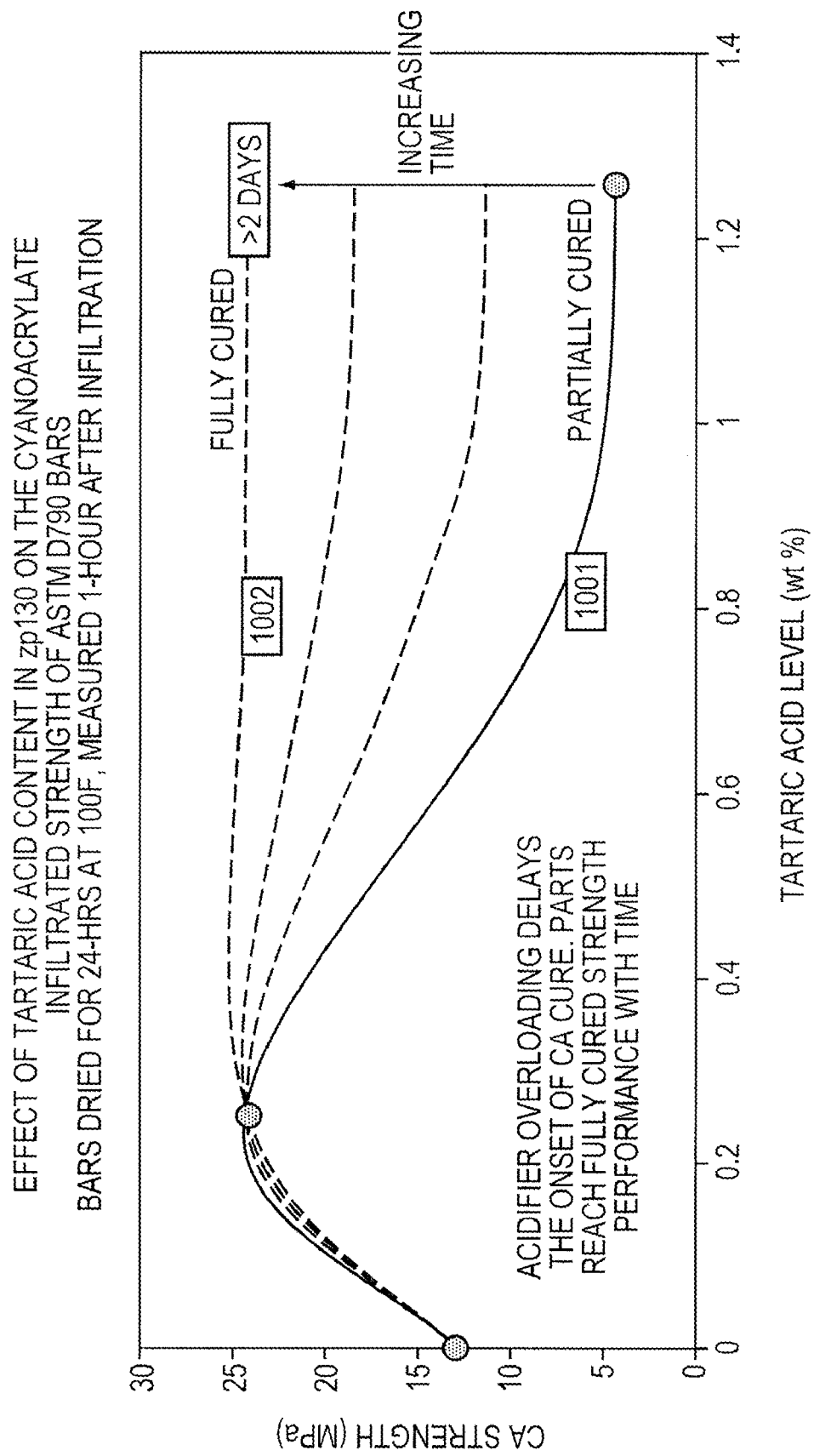
FIG. 10 is a graph illustrating the impact of acidifer level on the final article strength and infiltrant curing rate in a series of formulations.

FIG. 10 shows the impact of acidifer level on the final strength of a 3D printed article after infiltration with a cyanoacrylate resin (zbond101, by Z Corporation) and on the infiltrant curing rate in a series of powder formulations. Printed strength bars were dried in a 100° F. convection oven for 24 hours and infiltrated with the zbond101. The strength of the articles was measured one hour after infiltration. This timing approximates the article-making choreography for an operator of a zprinter310 who is attempting to make a strong prototype article with the material system in question. A powder/infiltrant formulation is more useful if it achieves higher strength in a shorter amount of time. The variable changed in the experiment is the amount of tartaric acid in the powder, ranging from 0-1.2 wt %. Articles made with the powder containing less than 0.4% tartaric acid fully cured within the one-hour time frame. Curve 1001 represents the approximate strength of a cyanoacrylate infiltrated, 3D printed plaster based article over a range of Tartaric acid levels. For concentrations greater than 0.4 wt % acid, the cure of the cyanoacrylate is so substantially inhibited that the article is still weak one hour after infiltration. Curve 1002, representing the strength of the same articles measured several days after infiltration shows that the articles in question eventually do become solid, attaining the full strength of articles made with lower levels of cyanoacrylate, though it may take in excess of two additional days for some systems to cure. As illustrated by the difference between curves 1001 and 1002, parts made with formulations with an excess of tartaric acid and then infiltrated with zbond101 take hours to days to achieve a full cure, and are not useful for conveniently making articles in the rapid prototyping field, i.e., they may not be adequately adapted for three-dimensional printing.

Acid concentration in the powder has an effect on the ease of use and on the final article performance. Overinhibiting the set of an infiltrant can cause the article to remain tacky and have low strength for an extended periods of time (hours), delaying the instant of use for the prototype. The delayed cure of an infiltrant may provide a stronger final article. Underinhibiting typically reduces the degree of infiltrant penetration, making the article weaker.

Some suitable acids for inhibiting the infiltrant reaction, e.g., a reaction with cyanoacrylate, are fumaric acid, tartaric acid, fatty acids, gluconic acids, adipic acid, glucono-delta-lactone (GdL), ethylenediaminetetraacetic acid, succinic acid, a phenolic compound, and combinations thereof.

Accelerators may be included in the particulate mixtures to control setting rates. For example, in plaster-based systems, accelerators may be used to control the set rate of the plaster during printing. Plasters that set too slowly allow various distortions associated with the volume changes during the dissolution and drying of most water soluble adhesives. Acceleration of plaster is typically achieved through the use of a combination of potassium sulfate and terra alba, though many other options are possible, including hydrated gypsum, potassium sulfate, and potassium aluminum sulfate.

Fluid Binder

In a preferred embodiment, a fluid binder is an aqueous fluid that includes or consists essentially of:

| | |
|---|---|
| water | 70-90 wt % |
| humectant | 1-10 wt % |
| preservative | 0.05-5 wt % |
| surfactant | 0-2 wt % |
| optical brightening agent | 0-5 wt % |

The aqueous fluid may also include rheology modifiers at a concentration of 0.01-5 wt %. As discussed below, the aqueous fluid may include a fluorescent brightener based on stilbene chemistry or distyrylbipheyl.

Humectants may serve to keep the nozzles of the print head from drying out and forming a crust when uncapped, such as during the period when the print head is not firing droplets but moving over the build area to a new position. The type and concentration of a humectant may also influence the dynamics of droplet formation, the consistency of drop trajectory, and the curing of the article formed by three-dimensional printing. Examples of suitable humectants include Glycerol and other diols from 3-10 carbons long; many other examples of humectants are known in the art. Printing can be successful with humectant levels from 1-20% depending on the binder formulation.

The preservative may serve to prolong the shelf life of the fluid as manufactured, as well as to extend its useful life in the machine. Preservatives may have detrimental effects on print quality, and in some cases on the appearance or curing of the article being formed by three-dimensional printing. It is generally desirable to choose environmentally friendly, stable, and substantially clear preservatives. An example of a suitable preservative includes the Proxel GXL, manufactured by Arch Chemical. Many other suitable preservatives are available in the industry.

Surfactants are typically used to control the surface tension of the aqueous fluid. Proper surface tension helps ensure that the droplets being ejected from a print head are formed with a consistent volume, depart from the print head at the appropriate vector, and that they do not form satellite drops. Very high surface tension may create poor wetting when the binder impacts loose powder. Low surface tension may create poor droplet formation at the face of the print head. Surface tensions of successful binders for use with an HP 11 print head range from 30 dynes/cm to 36 dynes/cm. Suitable surfactants include Surfynol CT-171, Surfynol 465, and Surfynol 485 in ranges from 0.24 wt % to 1.5 wt %. Such products are available from Air Products. The range of viscosities of the aqueous fluid suitable for use with HP 11 print heads is 1-1.35 cps. pH of the fluid can also have impact on the safety of the product, the effect of the binder on the reaction rate of the plaster, and the compatibility of the fluid with the materials of construction of the machine. An acceptable range of pH for the aqueous fluid is from 4.9 to 10.3.

Figure 11:
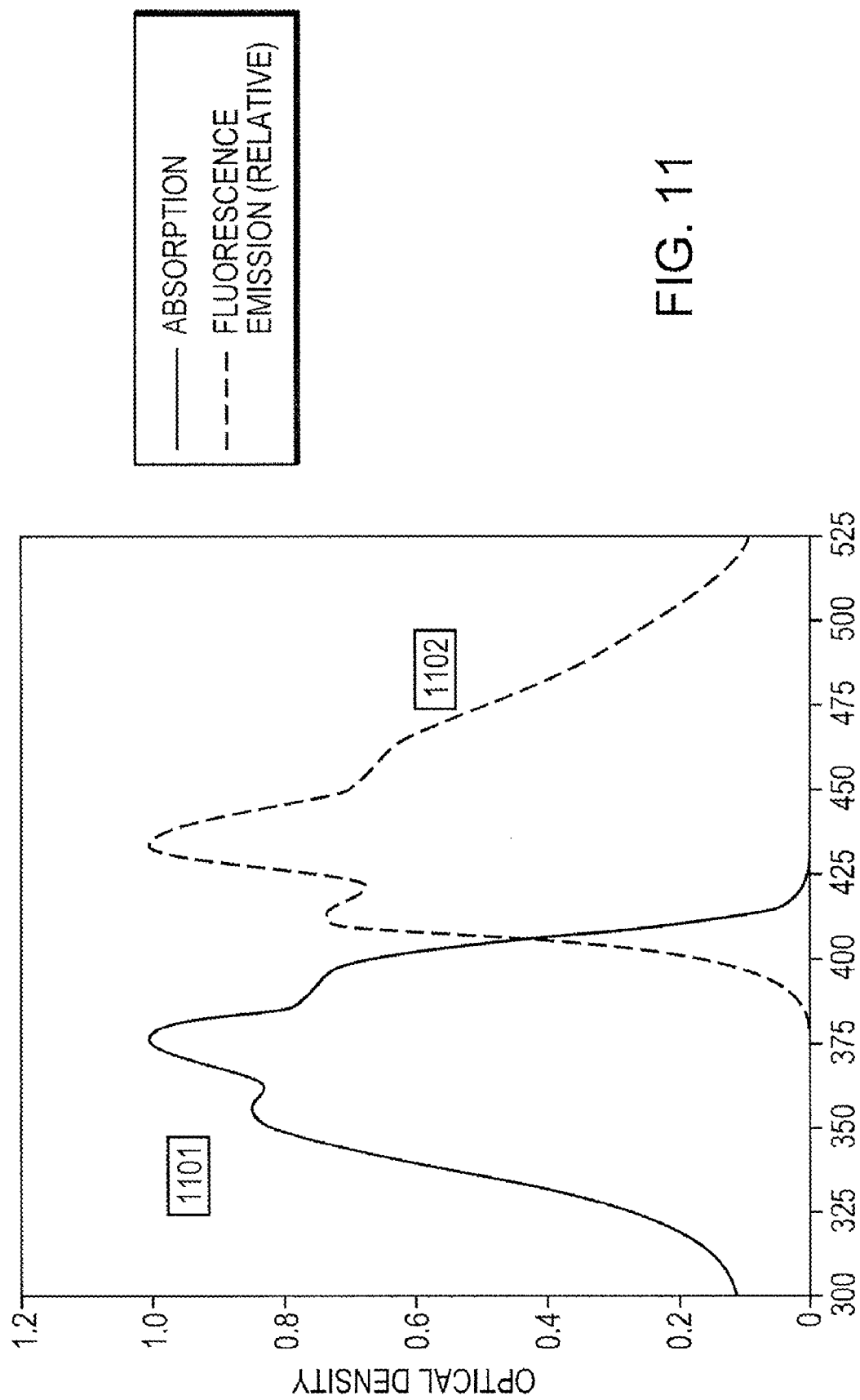
FIG. 11 is a graph illustrating the operating principle of optical brightening.

The aqueous fluid may be used for three-dimensional printing, such that an article printed with the aqueous fluid comprising the optical brightening agent has a lower chroma C* than an article printed with the aqueous fluid without the optical brightening agent. Optical brighteners are used to color correct the whiteness of a three-dimensional printed part. Optical brightening agents increase the perceived whiteness of an article by absorbing ultra violet light<400 nanometers (nm) and re-emitting blue light typically between 400 and 450 nm, increasing the reflected light in the visible spectrum. FIG. 11 illustrates the operating principle behind fluorescent brightening; the image is taken from Ciba Specialty Chemicals publication number 016263.040e/CH; April 1999, edited in Switzerland. FIG. 11 shows an exemplary graph of optical density vs. wavelength of light, expressed in nm. Optical density is a measure of the absorbance of an optical element for a given wavelength of light. Light in the UV spectrum (curve 1101), i.e., from 200 nm to 400 nm, is absorbed by a fluorescent brightener, and re-emitted (curve 1102) in the blue wavelengths of the visible spectrum, which peak at around 475 nm. The lost UV portion of the light is not detected by the human eye.

Figure 12:
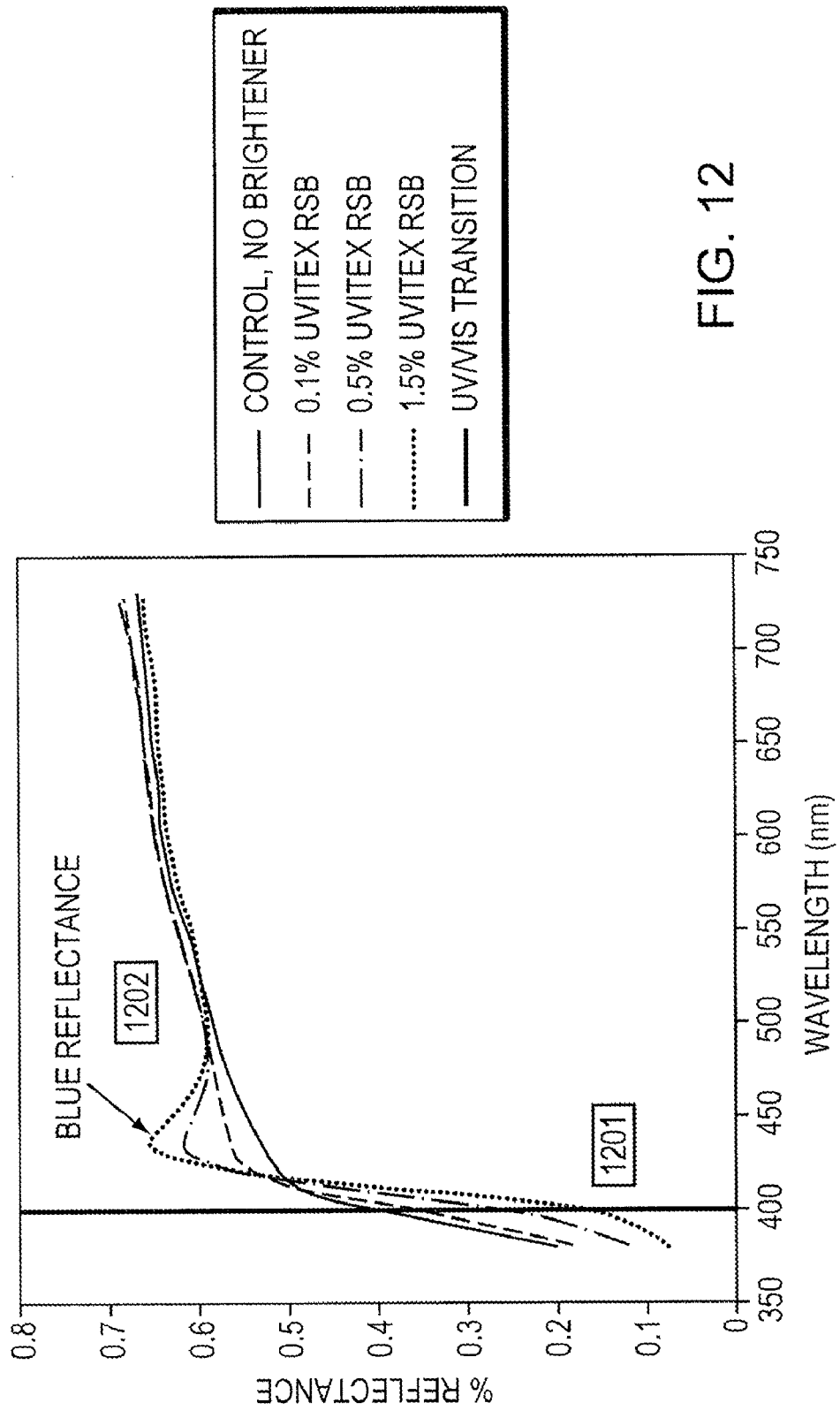
FIG. 12 is a graph illustrating percentage of reflectance of light from the UV region of samples of a plaster based article treated with a fluorescent brightener as a function of wavelength and brightener concentration.

The blue fluorescence of the optical brightener helps to overcomes the natural yellowness of the other raw materials. Quantitatively, this may be expressed as higher emission in the blue reflectance, as shown in FIG. 12. FIG. 12 is a plot of %reflectance versus wavelength as measured on a three-dimensional printed plaster article that was printed using the UvitexRSB optical brightener, and demonstrates the depression of the reflected light measured below 420 nm (region 1201) with a corresponding increase to the reflectance measured from 425 nm to approximately 500 nm (region 1202). Reflected light from the UV region of samples of a plaster-based article treated with fluorescent brightener was measured. The yellow cast of an article is counteracted as fluorescence increases the amount of light emitted in the blue wavelengths (430-460 nm). Higher concentrations of the optical brightener, e.g. UvitexRSB, increase the amount of fluorescence.

Figure 13:
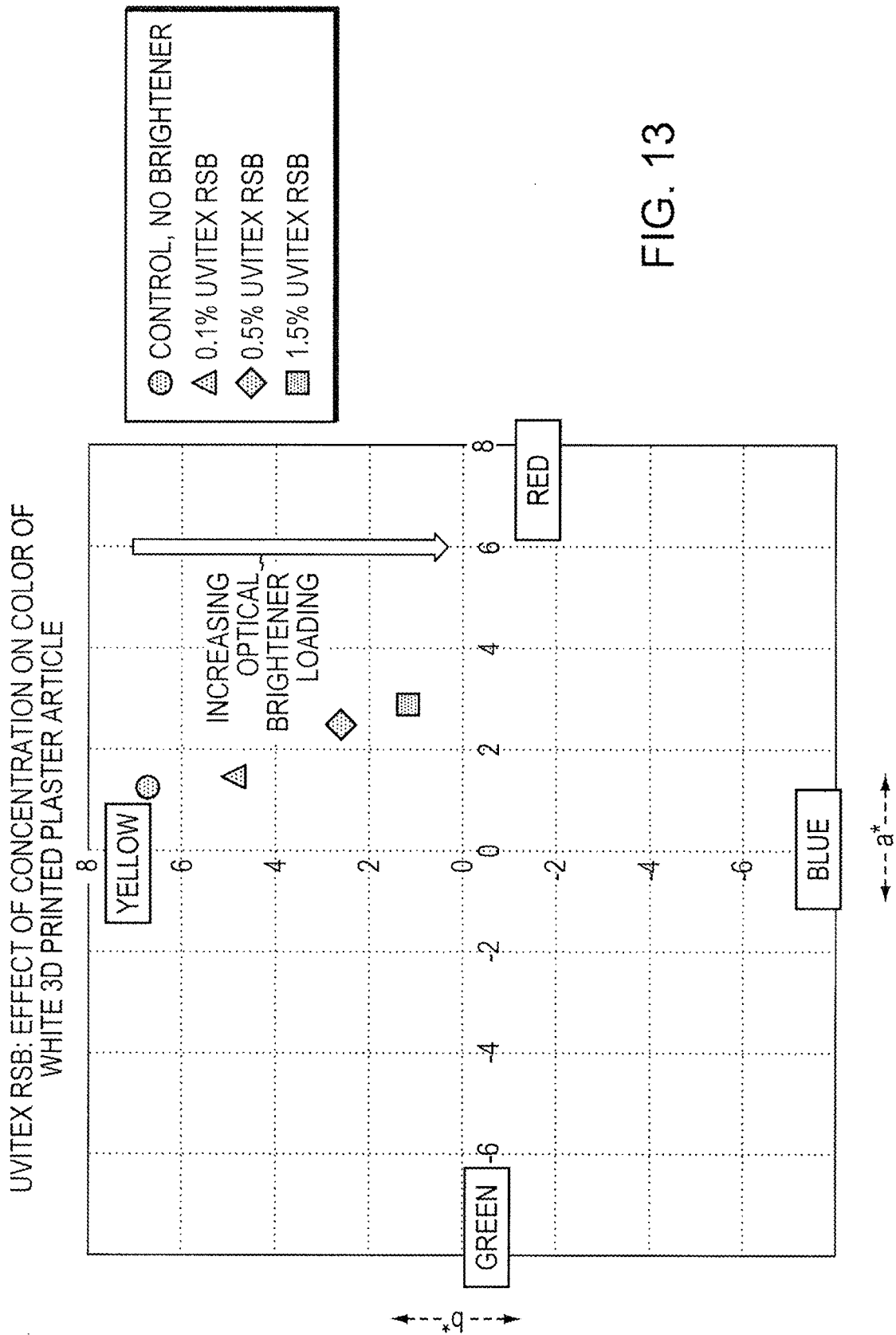
FIG. 13 is a graph illustrating the migration of a white point from yellow towards purple as the concentration of a fluorescent brightener is increased in a plaster-containing article.

Referring to FIG. 13, the effect of the optical brightener may also be shown in an $a^*$, $b^*$ plot of the white point of a plaster article printed with the aqueous fluid containing an optical brightener. In this plot, the $a^*$ axis represents colors from green to red and the $b^*$ axis represents the spectrum from yellow to blue. The addition of a fluorescent brightener to a nominally white three-dimensional printed article shifts the color of the reflected light away from the yellow ($+b^*$) towards ($b^*=0$), while inducing a slight increase in $a^*$ as the concentration of the brightener is increased. This may create a slight purple cast in the article if too much optical brightener is used.

Figure 14:
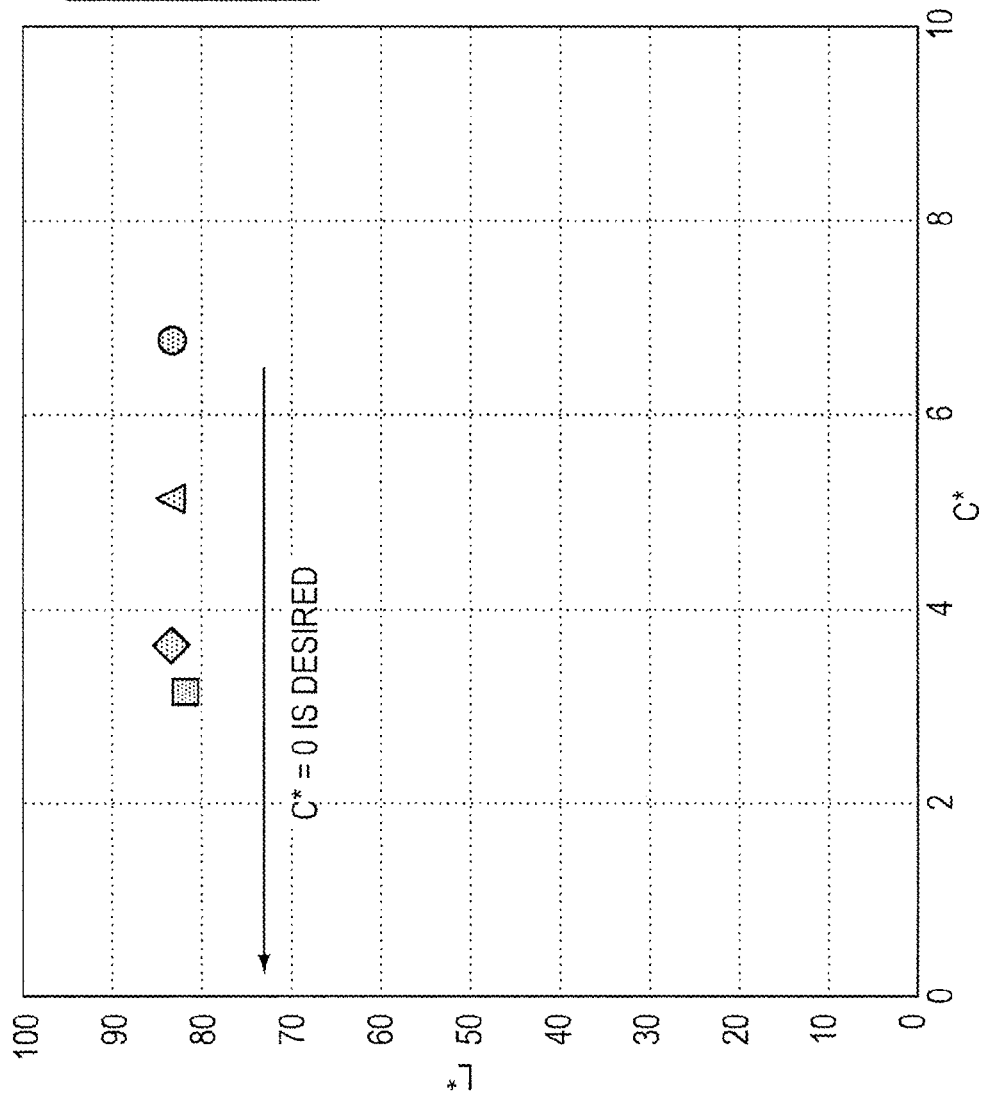
FIG. 14 is a graph illustrating reduction of chroma C* by fluorescence with little to no impact on the actual brightness of the article.

FIG. 14 is a plot of $L^*$ lightness versus $C^*$ chroma for a nominally white 3D plaster article as the concentration of Uvitex RSB is increased in the aqueous fluid from 0-1.5 wt %. A perfect white would have $L^*=100$ and $C^*=0$. Chroma $C^*=\mathrm{sqrt}(a^{*^2}+b^{*^2})$. In FIG. 14, $C^*$ continuously decreases as the brightness $L^*$ remains essentially unchanged up to 15 wt % of optical brightener in the aqueous fluid. $C^*$ of the white point is reduced by a factor of 2 as the concentration of optical brightener is increased from 0-1.5 wt % of the fluid, applied to a plaster-containing three-dimensional printing powder. FIG. 14 provides specific data regarding the effect of concentration of UvitexRSB on brightness and chroma of a white three-dimensional printed article. As one can see, the addition of fluorescent brighteners to an aqueous fluid may result in the reduction of chroma $C^*$ with little to no impact on the brightness of the article.

Some powdered whitening agents can overwhelm the capability of the dyes to create deep colors in the final article, especially if used in concentrations that completely correct chroma ($C^*$) defects. Using whitening agents in combination with an optical brightener in a binder/powder system can increase the color gamut in white and lightly colored regions more effectively than can be achieved with whitening agents alone. In a preferred embodiment, the optical brightener is only in the clear binder channel, as putting optical brighteners into deep colors, such as black, is unnecessary.

Optical brighteners, also known as fluorescent brighteners, are generally classified into the following six classes by Zollinger: stilbenes, 1,2-ethylene derivatives with two heteroaromatic residues, derivatives of coumarins, derivatives of 1,3-diphenyl-2-pyrazoline, naphtalimide compounds, and compounds obtained by direct linking of aromatic and heteroaromatic rings. In some embodiments of the invention, water soluble stilbenes with two to six sulfonate groups may be useful with concentrations ranging from 0 to 2 wt %. The brightener is preferably stable during the printing process. Stilbenes and Distyrylbiphenyl, with two to six sulfonate groups showed the best combined printability and optical brightening behavior. Examples of suitable optical brightening agents include products such as Uvitex NFW, Tinopal MSP, and Tinopal SFP, manufactured by Ciba, and Uvitex RSB, manufactured by Huntsman.

The aqueous fluid is preferably substantially clear, so as to not depress the brightness $L^*$ of the article, or increase its chroma $C^*$.

Kits

Particulate materials and aqueous fluids may be used together to enhance the whiteness and brightness of articles formed by three-dimensional printing. A preferred kit includes a powder adapted for three-dimensional printing, and an aqueous fluid for activating water soluble components of the three-dimensional printing powder. The powder may include a loose, dry, and substantially free-flowing particulate mixture including a water-soluble adhesive, plaster, a plaster accelerator, a whitening agent having an $L^*$ of at least 90 and a $C^*$ of up to 5.5, and a solid particulate additive including an acid. The aqueous fluid may include water, a humectant, a surfactant, a preservative, and an optical brightening agent in a range of about 0.05 to about 5 wt %. The particulate material is adapted for use in three-dimensional printing to form an article comprised of a plurality of layers, the layers including a reaction product of the particulate material and the aqueous fluid that contacts the particulate material during three-dimensional printing. The acid has a water solubility selected from a range of about 0-20 g/100 mL of water, a pKa selected from a range about 1 to about 4, and a $K_{ow}$ selected from a range of about −0.4 to about 1, and is adapted for modifying a cure rate of an infiltrant to facilitate penetration of the infiltrant into the article. The particulate mixture is substantially free of plaster retarders. The aqueous fluid is substantially clear, has a viscosity selected from a range of 1-1.35 cps, a surface tension selected from a range of 30-36 dynes/cm, and a pH selected from a range 4.9 to 10.3. The kit may also include a combination of binders comprising cyan, magenta, and yellow binders.

In another preferred embodiment, the powder includes a substantially dry particulate mixture including a water-soluble adhesive, a partially soluble filler, an accelerator, and a solid particulate additive comprising an acid. It also includes an the aqueous fluid including water, a humectant, a preservative, and an optical brightening agent. The particulate material is suitable for use in three-dimensional printing to form an article comprised of a plurality of layers, the layers including a reaction product of the particulate material and a aqueous fluid that contacts the particulate material during three-dimensional printing. The additive has a pKa of between 1 and 4, and a $K_{ow}$ selected from a range of –0.4 to 1, and is suitable for modifying a cure rate of an infiltrant to facilitate the penetration of the infiltrant further into the article. The kit may include a combination of binders including cyan, magenta, and yellow binders.

Printing Method

An article may be formed by three-dimensional printing as described above. In particular, a substantially dry particulate material may be provided, comprising a plurality of adjacent particles, the particulate material being substantially dry and including a water-soluble adhesive, an accelerator, and at least one of (i) a whitening agent and (ii) an acidic additive for controlling the cure rate of an infiltrant. A fluid binder is applied to at least some of the particles in an amount sufficient to bond those particles together to define at least a portion of the article, the fluid binder may include one or more of the following components: water, a humectant, a rheology modifier, a surfactant, a preservative, and an optical brightening agent. The article may be bonded without mechanical agitation and/or supplemental electromagnetic radiation of the particulate material. The bonded particles may define layers including a reaction product of the particulate material and the aqueous fluid that contacts the particulate material during three dimensional printing, with the particulate material being capable of supporting the article during three dimensional printing and suitable for being spread in a layer of dry particles having a thickness selected from a range of about 12 to about 125 μm.

The article may develop a strength of at least 1 MPa within one hour of being printed. This rapid development of strength is due, in the preferred embodiment, to the setting of the plaster filler. The dissolution and drying of the water soluble adhesive adds toughness to the article.

Flow Properties of Build Materials

Compositions have been disclosed that relate to control of the flow properties of the build material in three-dimensional printers. The three principle methods are the addition of liquid "processing aids," control of grain size distribution, and the addition of solid fillers that contribute to the frictional behavior of the build material. Many candidate materials have been disclosed previously, for example, in U.S. Patent Publication Number 2005/0003189. Previously, however, the exact implementation of these methods has been by trial and error. Here, some mechanical properties of dry particulate build materials are disclosed that are particularly suited for use in three-dimensional printing, especially in contrast to other formulations of similar materials for other uses that may not require special flow characteristics of the raw materials.

Figure 15:
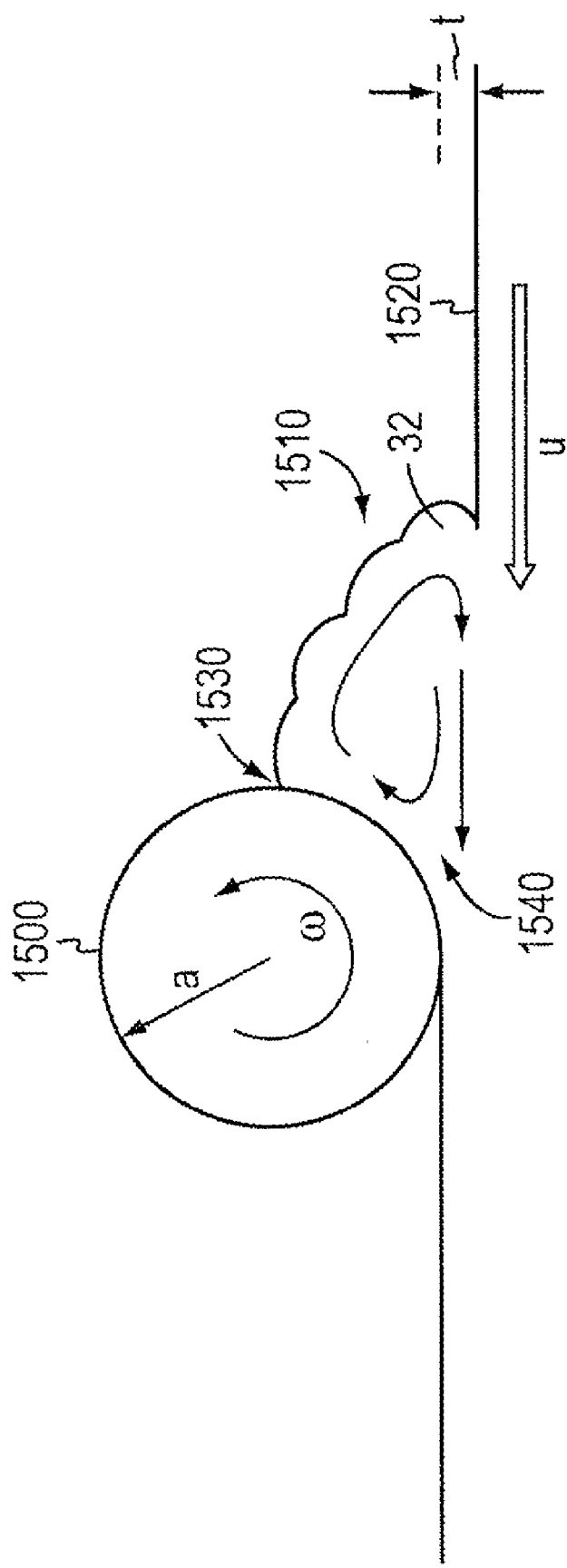
FIG. 15 is a schematic illustration of a circulating spreader bead.

Referring to FIG. 15, in an embodiment of a three-dimensional printer, dry, free-flowing particulate build material is spread by a rotating spreader rod 1500. The rod rotates in a direction counter to the direction of motion of the spreading mechanism. A circulating bead 1510 of build material 32 is pushed in front of a moving rod over a stationary bed. For the sake of convenience, the system is shown in the frame of the rod with a moving bed 1520 and stationary bead. The bed is assumed to approach the spreader, and the bead of build material circulates around a nearly stationary center. One may assume that the build material is lifted by the leading surface of the spreader rod because it adheres to the rod surface 1530. The direction of the flow of the build material reverses close to a nip 1540, i.e., an interface between the spreading roller 1500 and the moving bed 1520

The equilibrium of a small printed feature as it passes directly underneath the spreader rod is analyzed. On typical three-dimensional printers, the thickness t of a single printed layer of build material 32 is approximately 1/100 the radius of the spreader rod. Referring to FIG. 16, the spreader exerts a compressive stress $\sigma_{ZZ}$ and a shear stress $\tau_{XZ}$ on the build material directly underneath it. There is also a horizontal stress component $\sigma_{XX}$.

One may assume that the horizontal stress applied to the left edge 1600 of the feature is not opposed by another stress on the right edge 1610. The feature is assumed to leave a wake 1620 behind it where build material, after being swept along the upper surface, is unable to wrap around the downstream corner and establish a stress analogous to hydrostatic pressure against the right surface. The horizontal stress applied to the left may be opposed by a shear stress along the bottom surface. A free body diagram of the feature is shown in FIG. 16b, including a hollow cavity 1630 formed in the feature wake 1620.

It is assumed here that dry, free-flowing particulate build material in motion possesses a different shear strength than build material that has been allowed to rest for a time. In general, one may expect a different yield locus for build material in different states of motion. For purposes of this derivation, this is expressed here as two different sets of yield parameters, "static" and "dynamic" values of the cohesion and friction angle.

These properties of particulate materials are amply supported in the literature. See, for example, B. M. Das, Advanced Soil Mechanics, Hemisphere Pr. 1997, pp. 315-317 or S. Aranson & L. S. Tsimring in *The Physics of Granular Media*, H. Hinrichsen & D. Wolf, eds, Wiley-VCH, (2004) pp. 146-147, incorporated herein by reference in their entireties.

Figure 17:
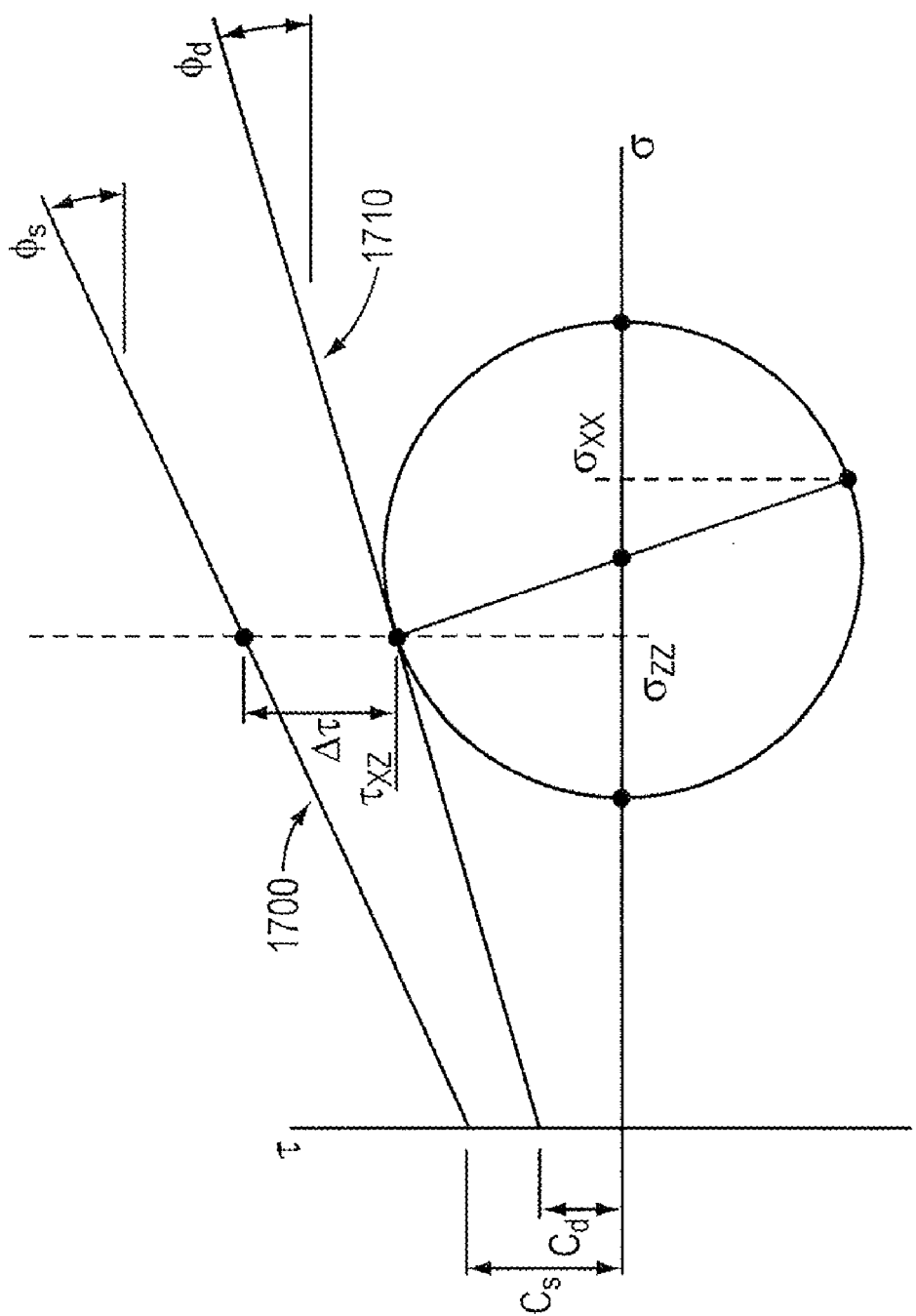

A force balance on the feature shown in FIG. 17 leads to the equation:

$$1[c_s - c_d + \sigma_{ZZ}(\tan\phi_s - \tan\phi_d)] = L\Delta\tau > t\sigma_{XX} \quad (3)$$

for the feature to remain in place. The normal stress against the bottom surface of the feature is assumed the same as that against the top surface. The difference in shear strength between the static values (static yield locus 1700) and dynamic values (dynamic yield locus 1710) with normal stress $\sigma_{ZZ}$ is denoted by $\Delta\tau$. "Bredt flow parameter" (Br) is herein defined, expressing, in general, the propensity for printed features to shift in the build area of a three-dimensional printer during spreading of build material:

$$\Delta\tau/\sigma_{XX} = Br > t/L \approx 0.1 \quad (4)$$

The ratio t/L is slightly arbitrary. One may assume for practical purposes that features with a length at least several times the layer thickness (L~10 times t) are those that are preferably considered in this model. Layers with thickness of 100 μm are standard in three-dimensional printing machines that are currently available, and instability of isolated patches smaller than 1.0 mm may have a minimally discernable effect on the appearance of a model.

For the flow conditions most useful for three-dimensional printing, the build material is non-cohesive, i.e., the cohesion of the particulate material is much less than the dynamic pressure of material in flow. Using reasonable values for the bulk density of the build material and spreading speed in a standard ZPrinter®310 three-dimensional printer, one obtains an order of magnitude estimate:

$$c_s \approx c_d << (u+\omega a)^2 \approx 600 \text{ Pa} \quad (5)$$

A material having shear strength of this magnitude is a weak gel such as yogurt. While it is not "strong" in any sense of the word, it is by no means "free-flowing." As an additional estimate of the lower bound of the cohesion, we may observe that the bead of free-flowing particulate build material may be in a state of yielding at the bottom of the pile when the counter-roller begins to move it across the build area. In a ZPrinter®310 three-dimensional printer, the bead is approximately 1 cm tall. Accordingly, we require the following inequality to hold:

$$c_s \approx c_d \ll \rho g h \approx 100 \text{ Pa} \qquad (6)$$

This is typically a minimum acceptable range for cohesion in a particulate build material for it to be considered "free-flowing." While the compressive and shear stress imposed on the build material through the motion of the counter-roller may have a magnitude approximately 600 Pa, the cohesion is preferably accordingly less than 100 Pa in order for it not to adversely affect the layering of build material.

With the assumption that the cohesion is negligibly small, the following simplification can be made.

$$(\tan\phi_s - \tan\phi_d) > t\sigma_{xx}/L\sigma_{zz} \qquad (7)$$

and $$\frac{\sigma_{xx}}{\sigma_{zz}} = \frac{(1+\sin\phi_d)}{(1-\sin\phi_d)} \qquad (8)$$

This leads to an equation $$(\tan\phi_s - \tan\phi_d)\frac{(1-\sin\phi_d)}{(1+\sin\phi_d)} = Br_{nc} > 0.1 \qquad (9)$$

Equation 9 expresses a vitally important feature of free-flowing particulate build materials that are suitable for use in three-dimensional printing machines. The quantity on the left, $Br_{nc}$, is termed the "Bredt flow parameter for noncohesive particulate materials," and it preferably has a value greater than about $1/10$ for small printed features to remain stationary during spreading.

Measurement of Static and Dynamic Friction Coefficients

Methods exist for measuring the static yield properties of particulate materials in shear. See, for example, B. M. Das, *Advanced Soil Mechanics*, Hemisphere Pr. 1997, pp 313-326. It is found, however, that the values for the yield parameters $\phi$ and c vary with experimental conditions, and it is necessary to measure the properties in stress range of interest.

An example of a piece of laboratory equipment that is capable of measuring the static friction characteristics of particulate materials is the "ShearScan TS12" manufactured by Sci-Tec Inc. This device holds a sample of material in a cylindrical cell and applies a vertical load to the material to consolidate it to a specified level. The device then applies a gradually increasing transverse shearing force until it detects slip in the sample of material. It performs this measurement across a range of applied loads to develop a yield locus analogous to those pictured in FIG. 17. Since the instrument measures the shear stress at the instant of rupture, this is the "static" friction in the particulate material.

One difficulty in this analysis with the ShearScan instrument is that it is designed to measure the frictional characteristics of particulate materials in large silos when they are subjected to stress levels much larger than that found in the spreading system of a three-dimensional printer. The stress was estimated in equation (5) above to be on the order of ½ kPa, about $1/10$ the stress levels in the operating range of the ShearScan.

Furthermore, there does not exist an analogous instrument to measure the "dynamic" friction characteristics of particulate materials. Several instruments called "powder rheometers" exist, for example the FT4 Powder Rheometer manufactured by Freeman Technology. This device doesn't strictly measure a yield locus, however. It measures the rate of working of a particulate material in a specialized mixing cell where the stresses in the sample are not known. It is therefore not suitable for use in this model.

An approximate laboratory procedure may provide estimates of the flow parameter for non-cohesive particulate build materials. This is done by measuring the angle of repose of a pile of a particulate material under static and dynamic conditions. The procedure is accomplished as follows. On an unpolished type 304 stainless steel sheet with a 2B mill finish and a dimension of 12 inches square by 0.060 inches in thickness available from McMaster-Carr based in Elmhurst, Ill., a conical pile is formed from a particulate material sample by sprinkling particles very slowly at a bulk volumetric flow rate of 30 +/−15 mL per minute over one point using a 385 mL stainless steel funnel available from Lab Safety Supply in Janesville, Wis. from a height of about 1 cm above the growing top of the pile.

The height of the pile is chosen such that $$gh \approx (u+\omega a)^2$$

This ensures that the stress at the bottom of the heap is in approximately the right range. For ordinary three-dimensional printers manufactured by Z Corporation, this height is roughly 2 inches.

The initial diameter, d, and height, h, of the pile are measured. The ratio 2 h/d is an approximate measure of the static friction coefficient $\tan\phi_s$. Next, a small impact force delivered from an 18-8 stainless steel slotted spring pin, ½ inch in diameter and 2.25 inches long with a mass of 32.0+/−0.5 grams available from McMaster-Carr dropped onto the edge of the stainless steel sheet from a height of 0.65+/−0.02 inches so the pile collapses. It is necessary to deliver to the plate a relatively light impact so that the motion of the pile after the impact is primarily driven by gravity and not by kinetic energy. Two impacts may be sufficient. The final height and diameter of the collapsed pile are measured, and the ratio 2 h/d is an approximate measure of the dynamic friction coefficient $\tan\phi_d$.

Several particulate samples were measured in this manner, and the data are presented below. The calculated flow parameter is the "noncohesive" form given in equation 9.

TABLE 2

Measurements of flow parameter for various candidate particulate build materials

| Particulate sample | tan phi s | tan phi d | $Br_{nc}$ |
|---|---|---|---|
| zp100 | 0.83 | 0.52 | 0.11 |
| zp100 | 0.91 | 0.45 | 0.19 |
| zp100 | 1.00 | 0.65 | 0.10 |
| zp130 | 0.65 | 0.35 | 0.15 |
| zp130 | 0.74 | 0.40 | 0.16 |
| zp130 | 0.79 | 0.45 | 0.14 |
| 4F Lucite | 0.53 | 0.28 | 0.14 |
| 50 μm $Al_2O_3$ | 0.64 | 0.44 | 0.09 |
| Coated glass beads | 0.45 | 0.35 | 0.05 |
| +10 ppm Neobee M20 | 0.46 | 0.32 | 0.07 |
| +20 ppm Neobee M20 | 0.52 | 0.33 | 0.10 |
| +30 ppm Neobee M20 | 0.67 | 0.53 | 0.05 |
| +40 ppm Neobee M20 | 0.79 | 0.69 | 0.03 |
| +50 ppm Neobee M20 | 0.78 | 0.76 | 0.00 | zp100 and zp130 are products marketed by Z Corporation for building appearance models.

4F Lucite from Ineos Acrylics has a particle size between 55 µm and 70 µm.

Tabular 50 µm $Al_2O_3$ acquired from KC Industries

Glass Beads from Potter's Industries, 72 µm grain size, aminosilane surface treatment Neobee M20 was used to coat glass beads. Neobee M20 from Stepan Industries As these data approximately show, build materials designed by Z Corp for three-dimensional printing all fall in the same range, a little bit higher than the required lower bound. Some scatter in the results is to be expected with this approximate technique. Although the static angle of repose of zp100 is higher than in zp130, the flow parameter for the two build materials is nearly the same. In fact, qualitative experience shows that these two products perform about the same.

Of the other three materials tested, glass spheres alone had the poorest performance, with a flow parameter of only about 0.05. This, too, is supported by qualitative experience: glass beads alone are unsuitable for three-dimensional printing from the standpoint of spreading. However, glass beads may be mixed with various processing aids and with other particulate materials that may be finer or equal to in particle size having a non-spherical and irregular particle shape to achieve a desirable Bredt parameter greater than 0.10, thereby being suitable for use in three-dimensional printing.

To illustrate the extreme sensitivity of particulate behavior with even small additions of certain chemicals, generally referred to as "processing aids," a series of data were taken in which tiny (10 ppm) increments of a low-viscosity emulsifier are added to a sample of glass spheres. The flow parameter rises quickly, peaks, and falls away even more quickly even though both the static and dynamic friction angles increase through the series. The critical point occurs when the dynamic angle of repose transitions from a nearly constant value to a linearly increasing value. This shows that there can be rather sharp optima in composition to obtain useful spreading characteristics.

This test is a fairly useful technique for identifying relative performance properties between different candidate materials. The preferred method for evaluating flow properties of candidate build materials during formal optimization after the initial selection period is to test samples of the material on a working three-dimensional printer. Certain pathological geometries are known to those experienced in the art, and they can be evaluated either qualitatively or quantitatively. One particularly useful geometry for observing stability during spreading is a flat plate studded with pegs that are oriented downward during the build. During printing, the earliest layers addressed are a series of disconnected patches that are relatively free to shift in the build material. After these have been formed, a plate is printed that joins all of the pegs together in a single object. One can easily examine whether the pegs are uniform and straight, and one can evaluate the quality of spreading on that basis.

Additional Flow Properties of Build Materials

Compositions have been disclosed that relate to control of the flow properties of the build material in three-dimensional printers. The three principal methods are the addition of liquid "processing aids," control of grain size distribution, and the addition of solid fillers that contribute to the frictional behavior of the build material. Many candidate materials have been disclosed previously, for example, in U.S. Patent Publication Number 2005/0003189, the disclosure of which is incorporated herein by reference in its entirety. Some mechanical properties of dry particulate build materials are disclosed in the following discussion that are particularly suited for use in three-dimensional printing, especially in contrast to other formulations of similar materials for other uses that do not require special flow characteristics of the raw materials.

A method that may be used to quantify a particulate material's suitability for three-dimensional printing includes placing 1 liter in bulk volume of a particulate material in a metal cylinder with an inside dimension of 6.1 inches, and inside height of 6.2 inches so that the height of the powder is between 2.5 to 3.0 inches when the cylinder is capped with a translucent cover and laid on its side (i.e., the height of the cylinder is horizontal). The drum is then slowly rolled with a rotational velocity of 2.5 rotations/min +/−0.5 rotations/min until the powder reaches an angle where it avalanches upon itself. The distance that the drum rolled, s, is recorded and the angle, φ, can be determined from equation 10:

$$\phi = \frac{s}{r} \cdot \frac{180}{\pi} \quad (10)$$

where r would equal the outside radius of the drum. The angle, φ, is the internal angle of friction that particulate material has under these particular test conditions at a room temperature between 65 to 75° F. Various particulate materials known to have good and bad spreading characteristics are compared using this test method, and desirable range of internal angles of friction were determined. Table 3 summarizes the particulate material compositions that were measured.

TABLE 3

| Ingredient | Powder composition | | | | | | | |
| --- | --- | --- | --- | --- | --- | --- | --- | --- |
| | A | B | C | D | E | F | G | H |
| Potter's Spheriglass 2530 CP03 | 84.64% | | 79.72% | | | 100% | 99.8% | |
| Zinc Oxide Pigment | | | 4.75% | | | | | |
| Lucite Elvacite 2014 | 15.00% | | 15.19% | | | | | |
| Mineral Oil | 0.19% | | 0.18% | | | | 0.2% | |
| Cobalt Octoate, 65% in Mineral Spirits | 0.17% | | 0.16% | | | | | |
| Z Corporation zp131 | | 100% | | | | | | |
| Z Corporation zp102 | | | | | 100% | | | |

TABLE 3-continued

| Ingredient | Powder composition | | | | | | | |
|---|---|---|---|---|---|---|---|---|
| | A | B | C | D | E | F | G | H |
| Z Corporation zp100 | | | | | 100% | | | |
| Z Corporation zp130 | | | | | | | | 100% |
| Internal Angle of Friction +/− 95% Confidence Interval | 77° +/− 3° | 52.6° +/− 4.9° | 36° +/− 3° | 53° +/− 12° | 59° +/− 13° | 32° +/− 3° | 81° +/− 9° | 48° +/− 5° |
| Three Dimensional Printing suitability | Too Cohesive | Good | Too Flowable | Good | Good | Too Flowable | Too Cohesive | Good |

Based on the results indicated in Table 3, one can conclude that powders that have an internal angle of friction greater than 40° and less than 70° are suitable for three dimensional printing in systems that use layers on the order of 125 pm.

Figure 18A:
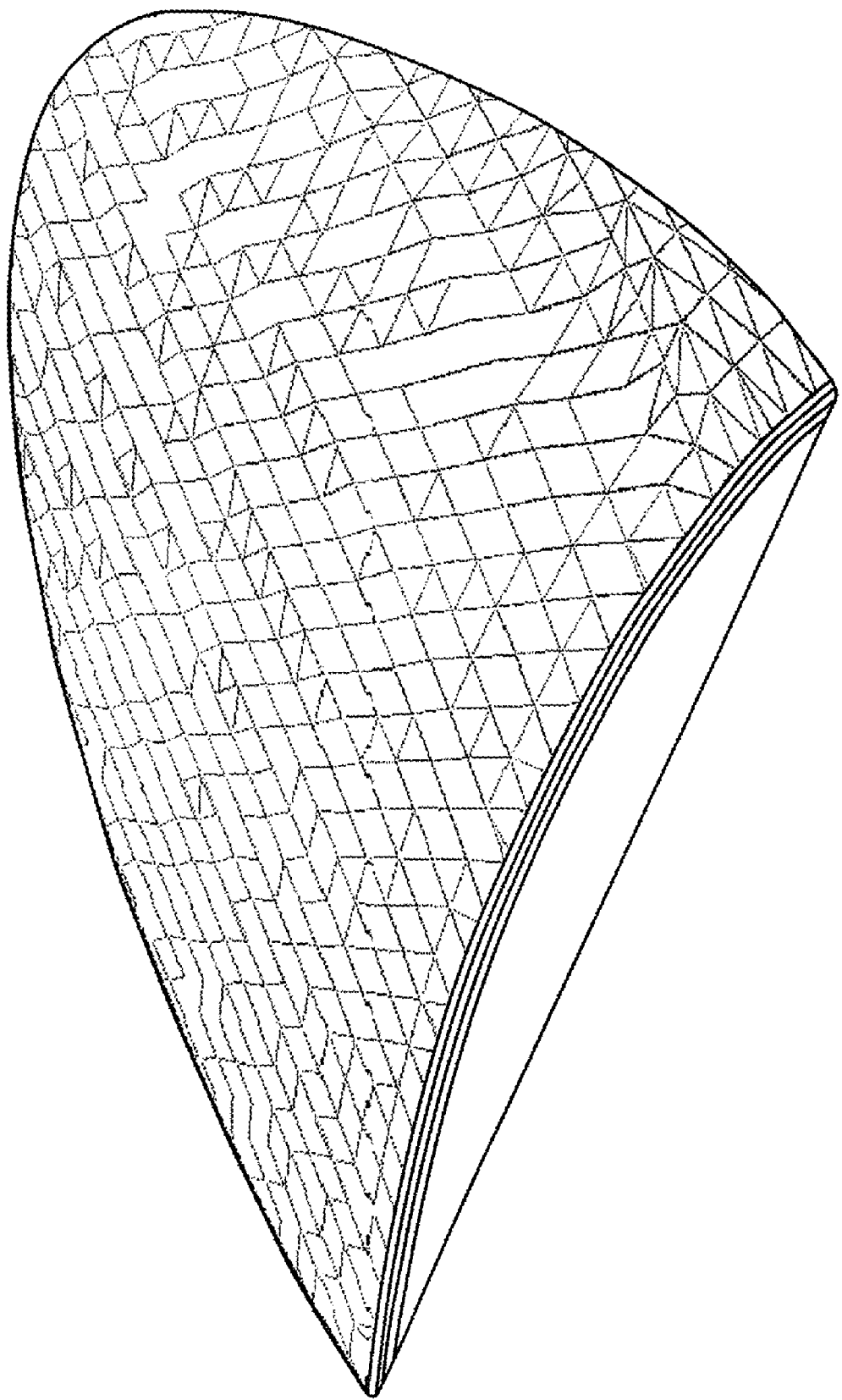
FIG. 18a is a CAD drawing of the article portion printed in FIGS. 19b and 19c.
Figure 18B:
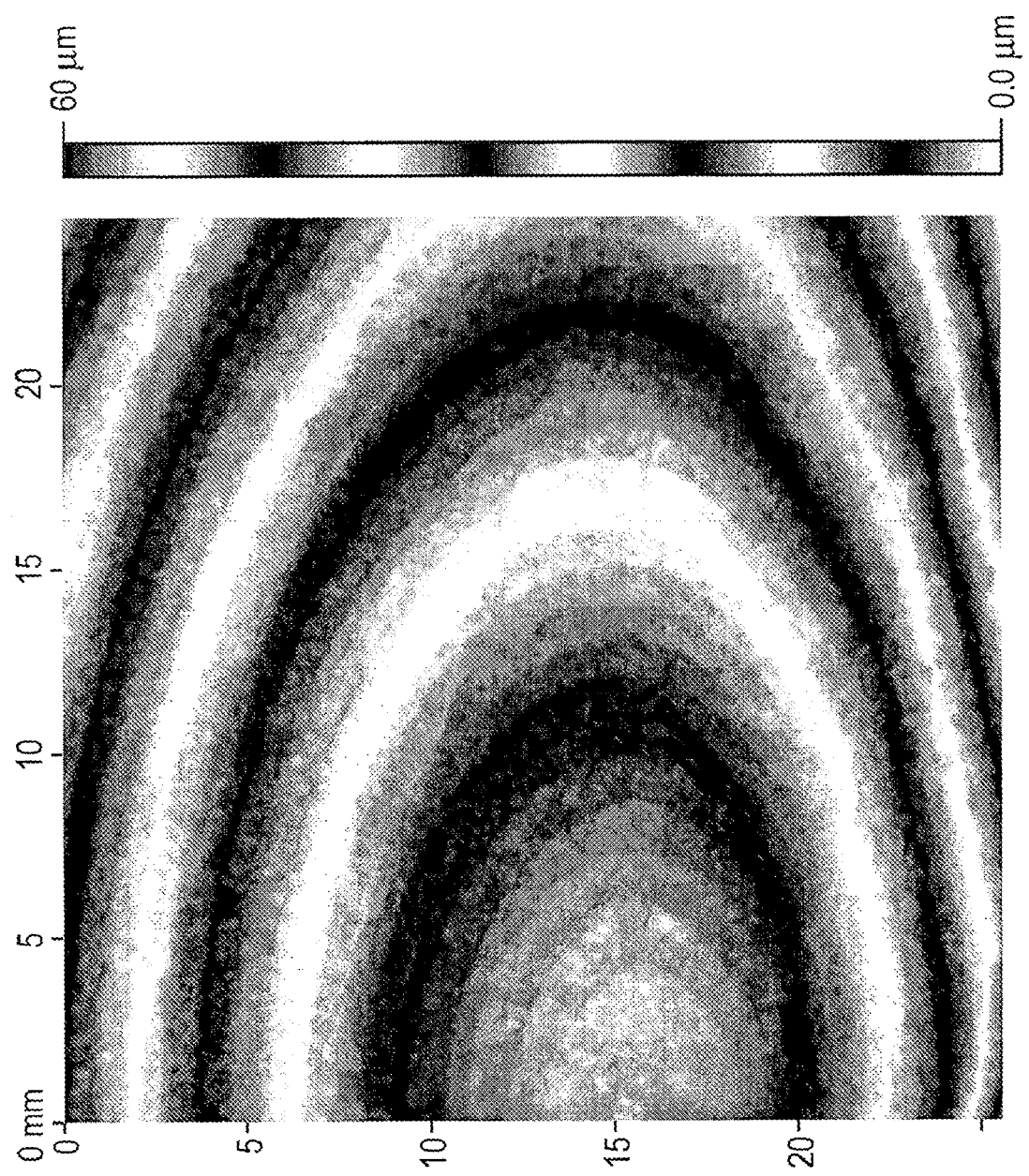
FIGS. 18b and 18c are laser profilometer images comparing the effect of particulate materials with high internal angle of friction on finished article properties.
Figure 18C:
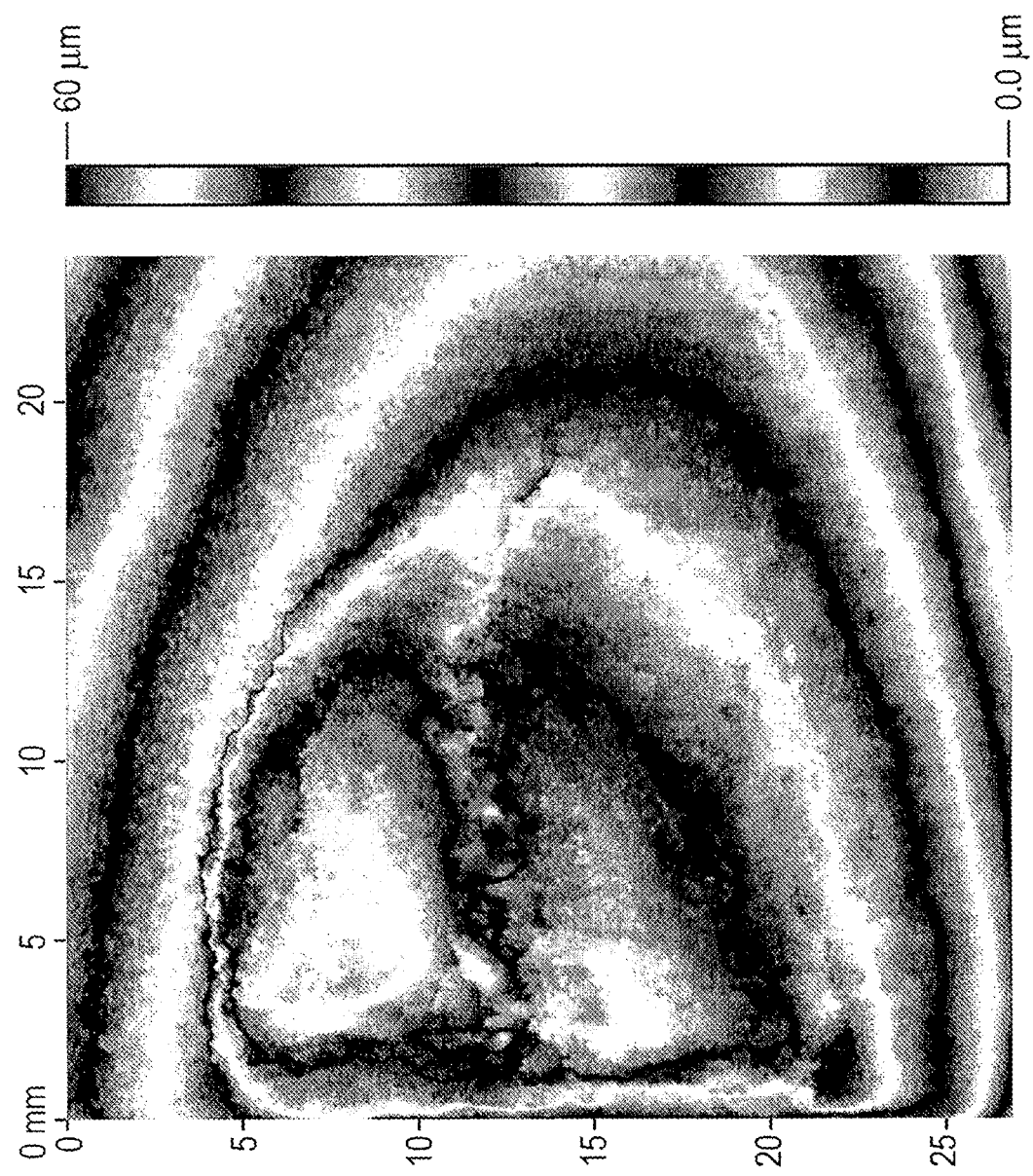

FIG. 18a is an exemplary CAD drawing of a test geometry that exhibits the distortion caused by the dragging of an article in a powder that is too flowable. FIGS. 18b and 18c are surface finish scans from a VIKING laser profilometer from Solarius. The figures show a 3D topographical representation of articles formed by three-dimensional printing. In FIG. 18b, a scan of an article made with zp131 from Z Corporation exhibits smooth, even contours that closely follow the intended CAD data. FIG. 18c is a scan of a typically "too flowable" powder with an internal friction angle <40°; the powder is too flowable and unable to resist the spreading forces causing previously printed layers to be displaced, resulting in an article that has a rough and uneven surface finish, or even has displaced artifacts missing from the surface of the article. The arrow in FIG. 18c shows where geometry has shifted during printing.

Figure 19A:
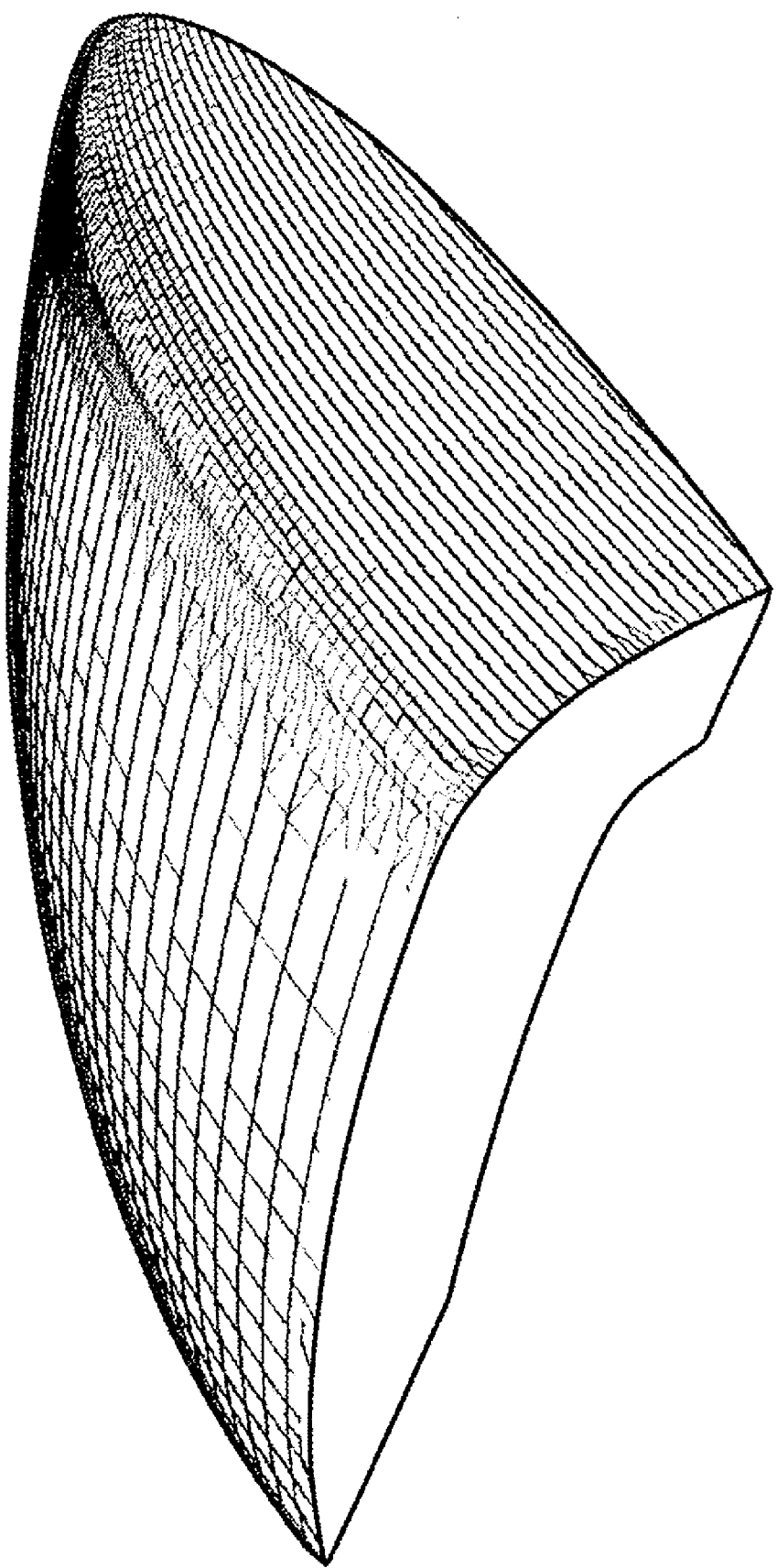
FIG. 19a is a CAD drawing of the article portion printed in FIGS. 20b and 20c.
Figure 19B:
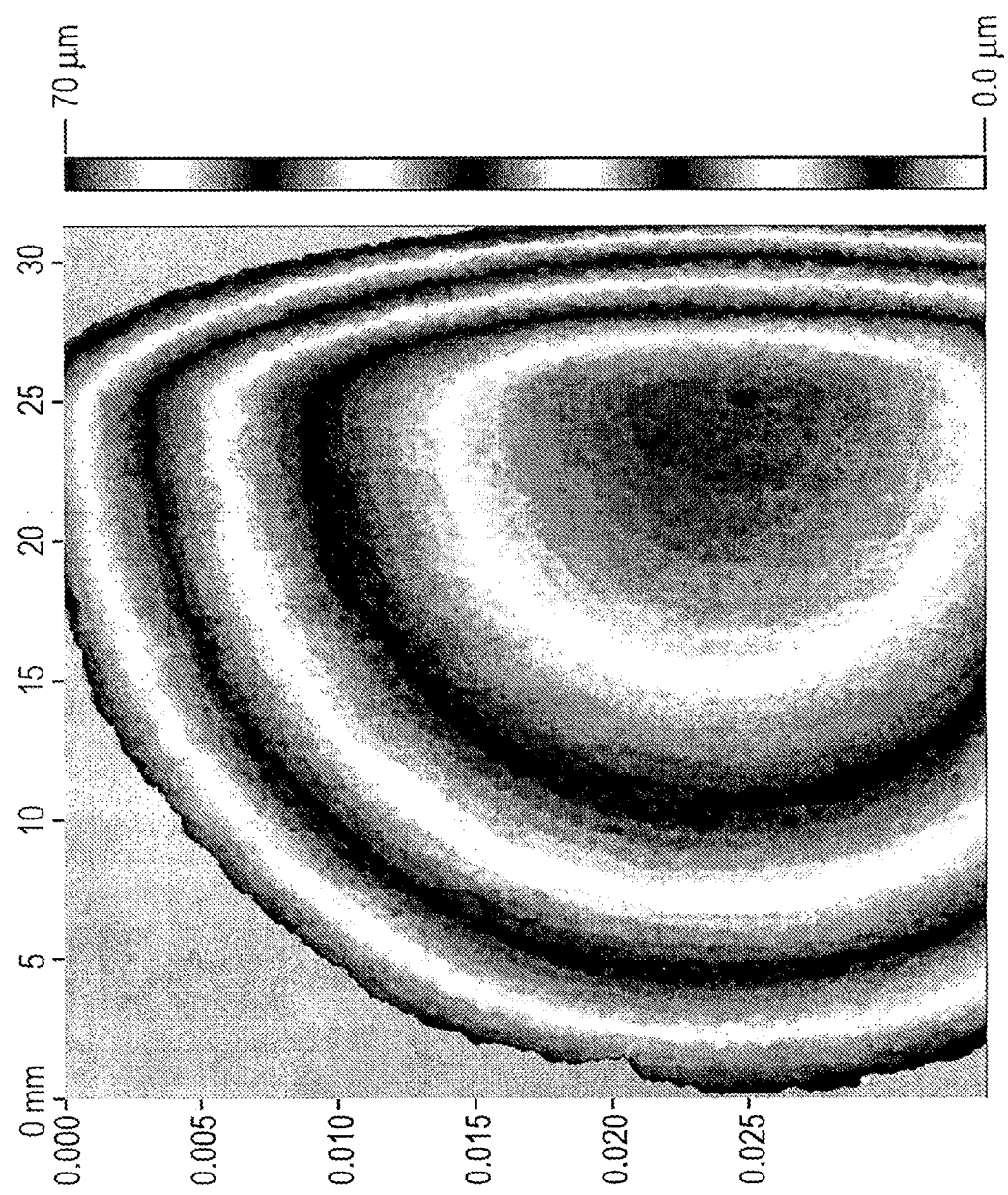
FIGS. 19b and 19c are laser profilometer images comparing the effect of particulate material with low internal angle of friction on finished article properties.
Figure 19C:
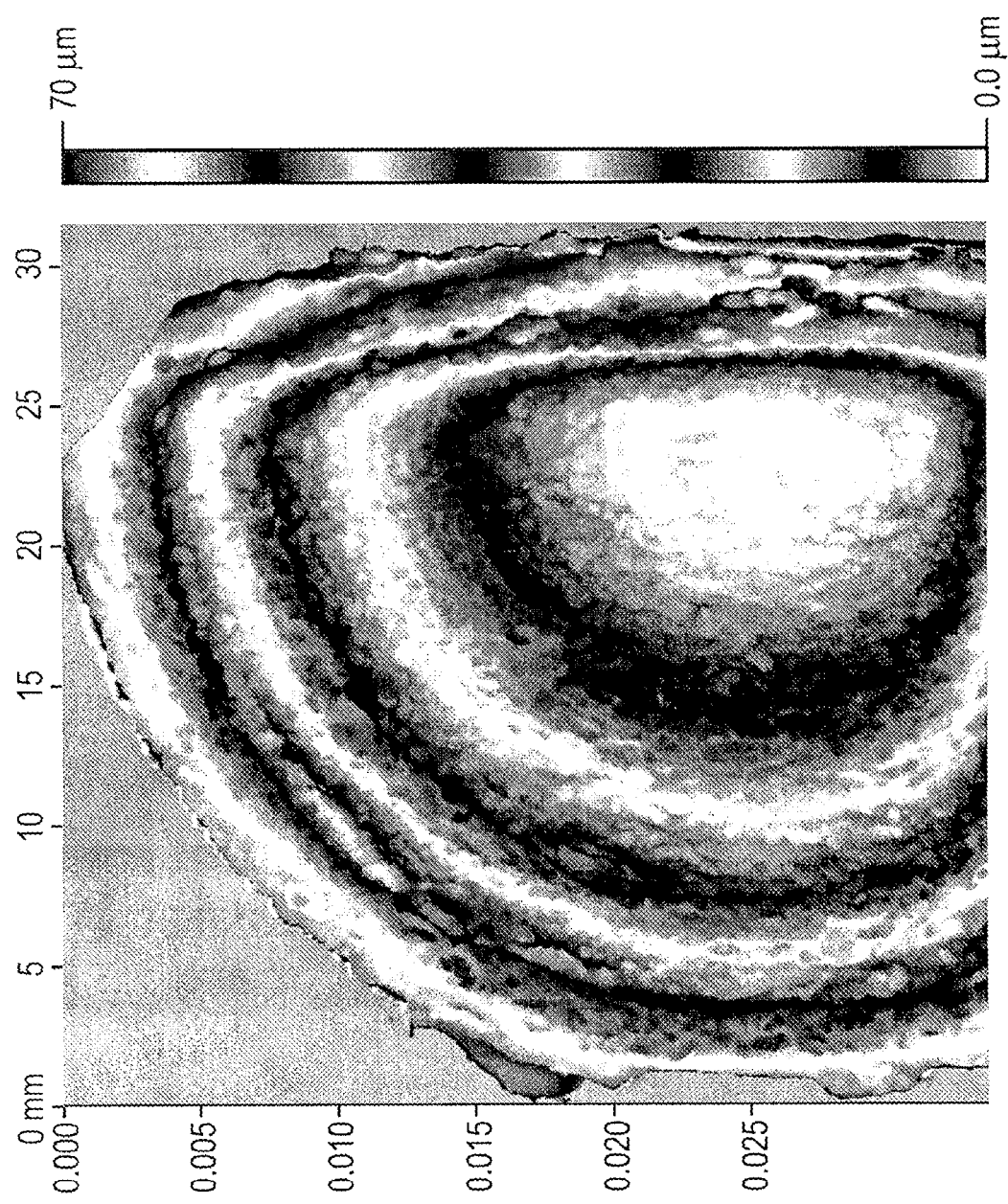

FIG. 19a is a CAD drawing of the formed article illustrated in FIGS. 19b and 19c. Referring to FIG. 19b, as one may expect, a particulate material with an internal angle of friction that is between 40° and 70°,e.g., zp131, provides a smoother finish than a particulate material with an internal angle of friction greater than 70° (FIG. 19c) where the powder is too cohesive to spread an even layer of particulate material, resulting in an article that has a rough and uneven surface finish.

This test, i.e., determination of an internal angle of friction, is a useful technique for identifying relative performance properties between different candidate materials. The preferred method for evaluating flow properties of candidate build materials during formal optimization after initial selection is to test samples of the material on a working three-dimensional printer. Certain pathological geometries are known to those experienced in the art, and they can be evaluated either qualitatively or quantitatively. One particularly useful article for observing stability during spreading is a flat plate studded with pegs that are oriented downward during the build. During printing, the earliest layers addressed are a series of disconnected patches that are relatively free to shift in the build material. After these have been formed, a plate is printed that joins all of the pegs together in a single object. One can easily examine whether the pegs are uniform and straight, and one can evaluate the quality of spreading on that basis.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A powder adapted for three-dimensional printing, the powder comprising:
    a loose, dry, and free-flowing particulate mixture comprising:
        a water-soluble adhesive;
        plaster;
        a plaster accelerator;
        a whitening agent selected from the group consisting of titanium dioxide, hollow glass spheres, and combinations thereof, and having a brightness L* of at least about 90 and a chroma C* of up to about 5.5; and
        a solid particulate additive comprising an acid,
    wherein (i) the particulate material is adapted for use in three-dimensional printing to form an article comprised of a plurality of layers, the layers including a reaction product of the particulate mixture and an aqueous fluid that contacts the particulate material during three-dimensional printing, and (ii) the acid has an acid ionization constant pKa selected from a range of about 1 to about 4 and an octanol-water coefficient $K_{ow}$ selected from a range of −1 to 0.5, thereby being adapted for retarding a polymerization rate of a cyanoacrylate infiltrant to facilitate penetration of the infiltrant into the article.

2. The powder of claim 1, wherein the dry particulate mixture has a Bredt parameter of at least about 0.10.

3. The powder of claim 1, wherein an internal angle of friction of the particulate material has a value selected from a range of 40° to 70°.

4. The powder of claim 1 wherein the particulate mixture comprises about 0.01% to about 5% by weight of the whitening agent.

5. The powder of claim 1, wherein a refractive index of the whitening agent is at least about 1.9.

6. The powder of claim 1 wherein the whitening agent has a solubility in an aqueous solution of 5 wt % glycerol of at least about 5 mg/liter.

7. The powder of claim 1 wherein the whitening agent comprises a second water-soluble adhesive.

8. The powder of claim 1 wherein the whitening agent is insoluble in an aqueous solution of 5 wt % glycerol.

9. The powder of claim 1 wherein the water-soluble adhesive comprises polyvinyl alcohol.

10. The powder of claim 1 wherein the acid ionization constant pKa of the acid is selected from a range of 2.8 to 3.2 and an octanol-water coefficient $K_{ow}$ of the acid is selected from a range of about −0.5 to about 0.5.

11. The powder of claim 1 wherein the particulate mixture comprises about 0.01% to about 5% by weight of the solid particulate additive.

12. The powder of claim 1 wherein the solid particulate additive is selected from the group consisting of fumaric acid, tartaric acid, gluconic acids, adipic acid, glucono-delta-lactone (GdL), ethylenediaminetetraacetic acid, succinic acid, a phenolic compound, and combinations thereof.

13. The powder of claim 1, wherein the plaster is selected from the group consisting of plaster of paris, sulphate of lime, hydrated calcium sulphate, dental plaster, $CaSO_4 \cdot \tfrac{1}{2}H_2O$, $CaSO_4 \cdot 2H_2O$, and combinations thereof.

14. The powder of claim 1, wherein the plaster accelerator is selected from the group consisting of hydrated gypsum, potassium sulfate, potassium aluminum sulfate, and combinations thereof.

15. The powder of claim 1 wherein the solid particulate additive is not a catalyst affecting a rate of a reaction between the plaster and the aqueous fluid.

16. The powder of claim 1 wherein the particulate mixture is substantially free of plaster retarders.

17. The powder of claim 1 wherein the particulate mixture comprises 50-95 wt % plaster.

* * * * *